US011873204B2

(12) United States Patent
Keeling

(10) Patent No.: US 11,873,204 B2
(45) Date of Patent: *Jan. 16, 2024

(54) BEVERAGE DISPENSING SYSTEM

(71) Applicant: Steven P. Keeling, Mokena, IL (US)

(72) Inventor: Steven P. Keeling, Mokena, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/651,008

(22) Filed: Feb. 14, 2022

(65) Prior Publication Data

US 2022/0162053 A1 May 26, 2022

Related U.S. Application Data

(63) Continuation of application No. 16/922,237, filed on Jul. 7, 2020, now Pat. No. 11,267,686, which is a (Continued)

(51) Int. Cl.

*B67D 1/14* (2006.01)
*B67D 1/00* (2006.01)
*B67D 1/04* (2006.01)

(52) U.S. Cl.

CPC ......... *B67D 1/1422* (2013.01); *B67D 1/0004* (2013.01); *B67D 1/0082* (2013.01); (Continued)

(58) Field of Classification Search

CPC .. B67D 1/0045; B67D 1/1405; B67D 1/1411; B67D 1/1422; B67D 1/1477; (Continued)

(56) References Cited

U.S. PATENT DOCUMENTS 41,330 A * 1/1864 Squarza ............... B67D 3/0045 222/25
177,860 A * 5/1876 Maguire ................. F16K 27/02 251/155
(Continued)

FOREIGN PATENT DOCUMENTS

DE 4207390 C1 9/1993
DE 10200229 C1 4/2003
(Continued)

OTHER PUBLICATIONS

PELZ_AT406152 MT; machine translation into english of AT406152; obtained on Feb. 7, 2023 from https://worldwide.espacenet.com/.*

*Primary Examiner* — Paul R Durand
*Assistant Examiner* — Randall A Gruby
(74) *Attorney, Agent, or Firm* — Paul J. Nykaza

(57) ABSTRACT

A beer dispensing faucet is configured to be attached to a shank connector. The shank connector has a connecting member and an internal passageway having an outlet opening positioned within the connecting member. The dispensing faucet has a housing defining a central conduit having an inlet opening and an outlet opening. The housing defines a valve seat in the central conduit and further has an aperture in communication with the central conduit. The inlet opening is dimensioned to correspond in size to the outlet opening of the internal passageway and further configured to be positioned in confronting relation to the outlet opening of the internal passageway. The housing has a connecting member configured to cooperate and connect to the connecting member of the shank connector. A valve stem is positioned in the aperture. The valve stem has a first position wherein the valve stem is engaged with valve seat to define a closed faucet position. The valve stem has a second (Continued)

position away from the valve seat to define an open faucet position.

11 Claims, 22 Drawing Sheets

Related U.S. Application Data continuation of application No. 16/175,542, filed on Oct. 30, 2018, now Pat. No. 10,703,620, which is a continuation-in-part of application No. 15/091,570, filed on Apr. 6, 2016, now Pat. No. 10,144,630.

(60) Provisional application No. 62/143,766, filed on Apr. 6, 2015.

(52) U.S. Cl.
CPC .......... *B67D 1/0406* (2013.01); *B67D 1/1477* (2013.01); *B67D 2001/0094* (2013.01)

(58) Field of Classification Search
CPC .. B67D 1/0082; B67D 1/0406; B67D 1/1461; B67D 1/07; B67D 1/1438; B67D 1/1444; B67D 1/1466; B67D 2001/0093; B67D 2001/0094; B67D 2001/0062; F16K 5/06–0605; F16K 5/0647; F16K 5/0652
See application file for complete search history.

(56) References Cited

U.S. PATENT DOCUMENTS 245,016 A 8/1881 Renton
292,489 A 1/1884 Huff
341,410 A 5/1886 Dummer et al.
656,262 A 8/1900 Perry et al.
772,668 A 10/1904 O'Brien
981,349 A 1/1911 Alexander
1,171,369 A 2/1916 Topping
1,367,246 A 2/1921 Ewald
1,385,951 A 7/1921 Range
1,490,227 A 4/1924 Osborn
1,501,310 A 7/1924 Chambers
1,507,718 A 9/1924 Rilling
1,512,017 A 10/1924 Field
1,709,325 A 4/1929 Runser
1,827,555 A 10/1931 Bolton
1,837,552 A 12/1931 Kelly
1,924,943 A 8/1933 Samuel
2,017,879 A 10/1935 Wiechmann
2,078,013 A 4/1937 Nutry
2,416,582 A 2/1947 Harr
2,634,745 A 4/1953 Cornelius
2,645,246 A 7/1953 Segal
2,929,406 A * 3/1960 Anderson ............. F16K 27/067 239/581.1
2,969,923 A 1/1961 Fremion
3,192,948 A * 7/1965 Anderson ............. F16K 5/0689 251/315.08
3,195,566 A 7/1965 Cornelius
3,231,140 A 1/1966 Krup
3,307,751 A 3/1967 Kraft
3,356,333 A * 12/1967 Scaramucci .......... F16K 5/0668 277/369
3,434,632 A 3/1969 Batrow
3,588,040 A 6/1971 Ward
3,635,439 A * 1/1972 McNally ................. F16K 5/201 251/315.14
3,708,901 A * 1/1973 Wolter .................... F41A 17/44 42/70.11
3,792,834 A * 2/1974 Billeter ................. F16L 19/061 285/348
4,177,832 A * 12/1979 Price ..................... F16K 5/0689 251/285
4,177,972 A * 12/1979 Legris ................... F16K 5/0647 411/522
4,629,121 A * 12/1986 Hengesbach ......... B05B 15/534 239/119
4,720,076 A 1/1988 Hyde
5,096,158 A * 3/1992 Burdick ............. F01M 11/0408 251/351
D331,964 S * 12/1992 Hengesbach ................ D23/245
5,246,202 A * 9/1993 Beamer .............. B60H 1/00328 251/297
5,368,205 A 11/1994 Groh
5,394,715 A 3/1995 Guerette
5,411,115 A * 5/1995 Shropshire ......... F01M 11/0408 251/100
5,794,823 A 8/1998 Roundtree
5,881,922 A * 3/1999 Hawkins .................. B67D 1/08 222/145.8
5,979,713 A 11/1999 Grill
6,019,257 A 2/2000 Rasmussen
6,050,545 A * 4/2000 Stolzman .............. F16K 27/067 285/410
6,230,769 B1 5/2001 O'brien
6,378,735 B1 * 4/2002 Chu ....................... B65D 83/06 222/548
6,457,614 B1 10/2002 Amidzich
6,648,178 B2 11/2003 Grunewald et al.
6,908,071 B2 6/2005 Roethel et al.
7,040,359 B2 5/2006 Younkle
7,051,763 B2 * 5/2006 Heren ................... F16K 27/067 137/883
7,114,703 B2 * 10/2006 Ciesielka ................ F16K 35/06 251/344
7,131,560 B2 11/2006 Hammond
7,168,683 B2 * 1/2007 Pliml, Jr. ................ F16K 24/04 222/499
7,178,699 B2 2/2007 Spray et al.
7,306,010 B2 * 12/2007 Gruener, Sr. ......... F16K 5/0647 251/315.16
7,721,921 B2 5/2010 Ramusch et al.
8,033,431 B2 10/2011 Sommerfield et al.
8,312,889 B2 * 11/2012 Oltman ................. F16K 5/0605 137/590
8,926,059 B2 1/2015 Justice et al.
9,016,140 B2 4/2015 Evans et al.
9,771,252 B2 9/2017 Hunter
10,144,630 B1 12/2018 Keeling
10,436,335 B2 * 10/2019 Hughes ............... F16K 15/1848
10,703,620 B1 7/2020 Keeling
10,871,249 B1 * 12/2020 Burns ................ F01M 11/0408
11,091,360 B2 * 8/2021 Christiansen ........ B67D 1/0884
11,142,445 B2 * 10/2021 Leone ................. F16K 11/0704
11,267,686 B2 3/2022 Keeling
2002/0088826 A1 7/2002 Barker et al.
2003/0006254 A1 1/2003 Itou et al.
2003/0111629 A1 6/2003 Amidzich
2003/0192615 A1 * 10/2003 Smith .................. B67D 1/1272 141/2
2006/0186136 A1 * 8/2006 Wauters ............... B67D 1/1405 222/105
2007/0050932 A1 * 3/2007 Sullivan ................... B67D 1/07 15/207.2
2007/0193653 A1 8/2007 Gagliano et al.
2007/0194264 A1 8/2007 Arov et al.
2008/0264953 A1 * 10/2008 Lowman .............. B67D 1/0406 220/592.19
2010/0258203 A1 10/2010 Meyer et al.
2012/0012770 A1 * 1/2012 Bugatti ................. F16K 5/0605 251/315.1
2012/0152985 A1 * 6/2012 Gauthier ................... C25C 3/14 222/567
2012/0248139 A1 10/2012 Haskayne et al.
2013/0256340 A1 * 10/2013 Matsie ................. B67D 1/1422 222/394
2016/0009542 A1 * 1/2016 Meyer ....................... F16K 1/04 222/505
2017/0210610 A1 * 7/2017 Henson ................ B67D 1/0406

(56) References Cited

U.S. PATENT DOCUMENTS

| | | | | |
|---|---|---|---|---|
| 2018/0266090 | A1* | 9/2018 | Tanghetti | F16K 5/0647 |
| 2020/0047137 | A1* | 2/2020 | Wilder | B01F 35/53 |
| 2021/0107781 | A1* | 4/2021 | Dirx | B67D 1/14 |

FOREIGN PATENT DOCUMENTS

| | | | |
|---|---|---|---|
| EP | 2933222 | A2 | 10/2015 |
| FR | 1313302 | A | 12/1962 |
| GB | 1486245 | A | 9/1977 |

* cited by examiner

FIG. 4a
PRIOR ART
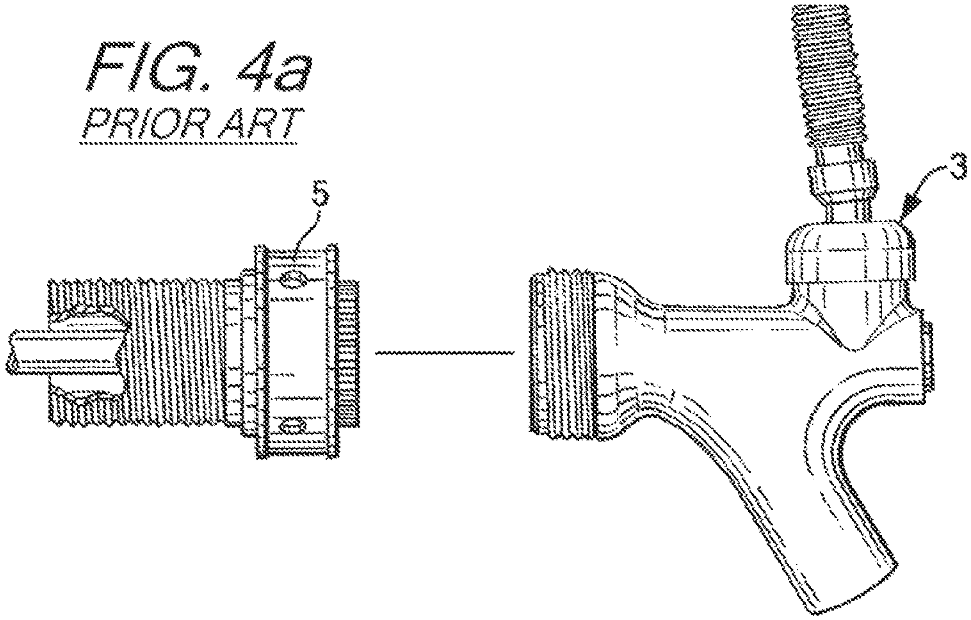
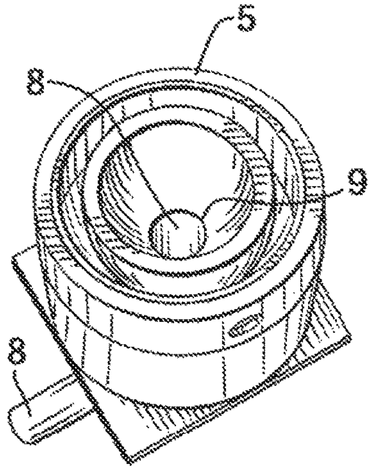
FIG. 4b
PRIOR ART
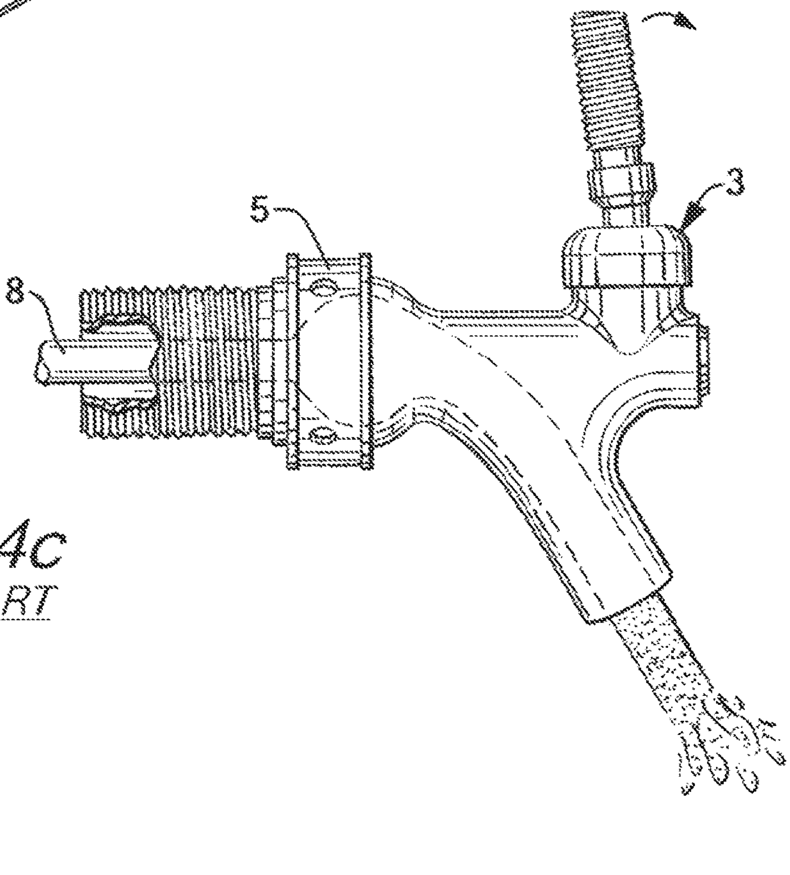
FIG. 4c
PRIOR ART FIG. 5
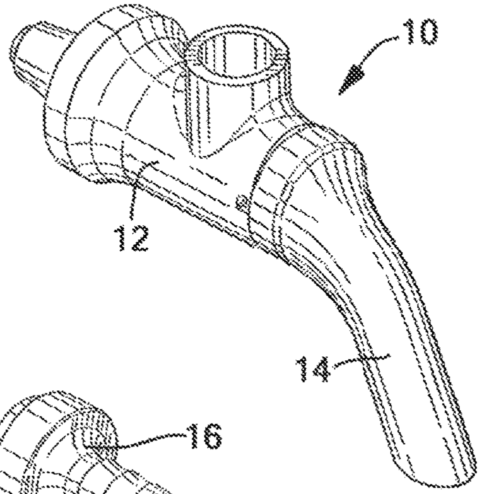
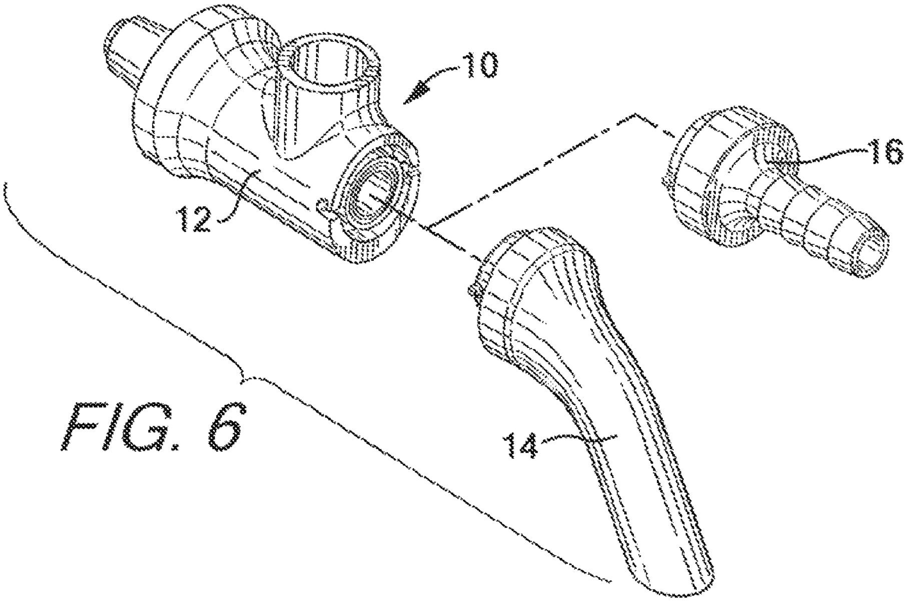
FIG. 6
FIG. 7
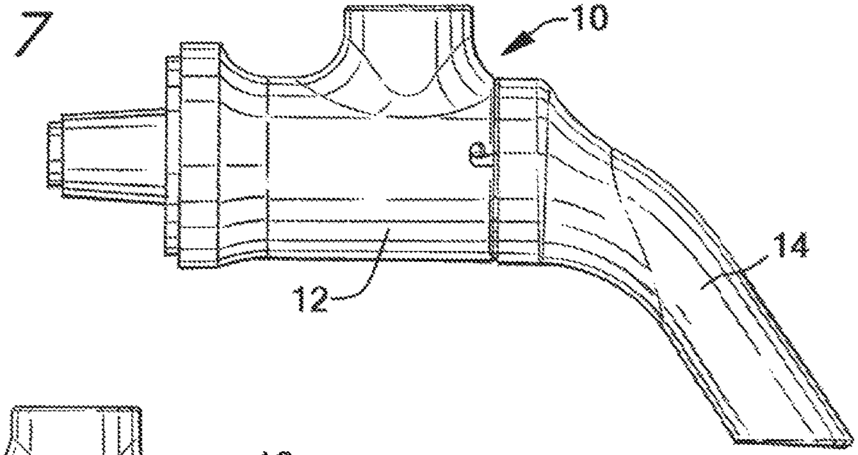
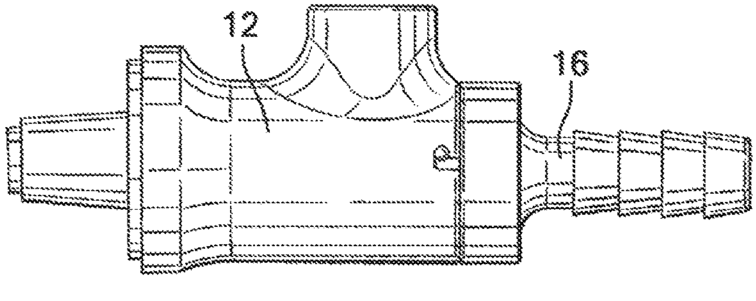
FIG. 8

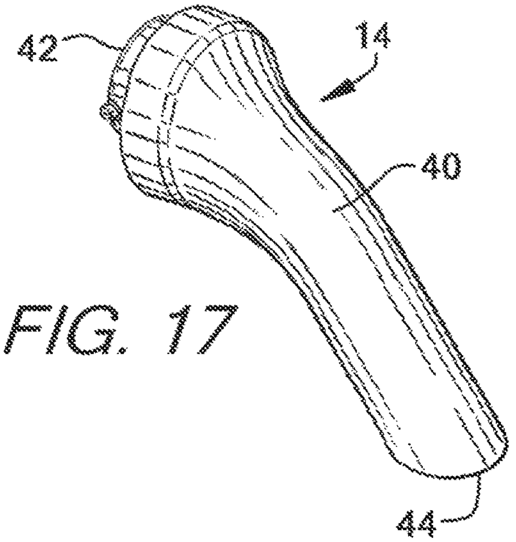
FIG. 17
FIG. 18
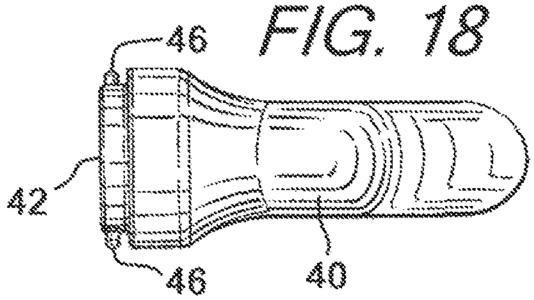
FIG. 19
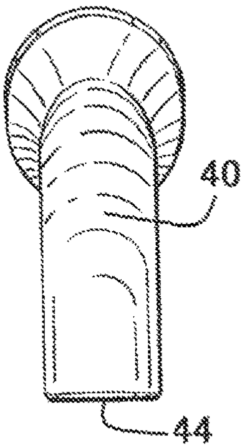
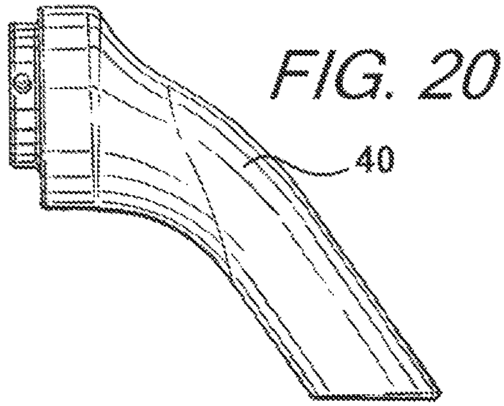
FIG. 20
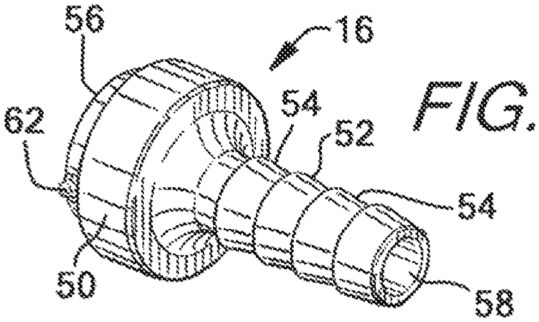
FIG. 22
FIG. 21
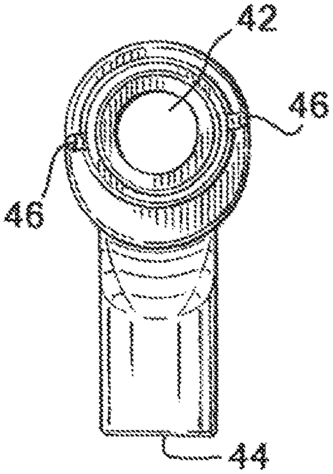
FIG. 23
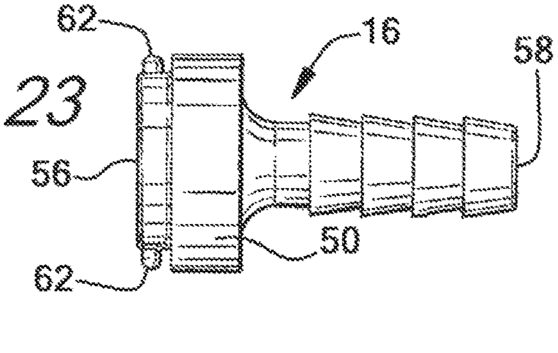
FIG. 24
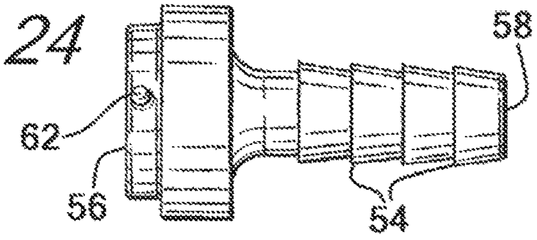

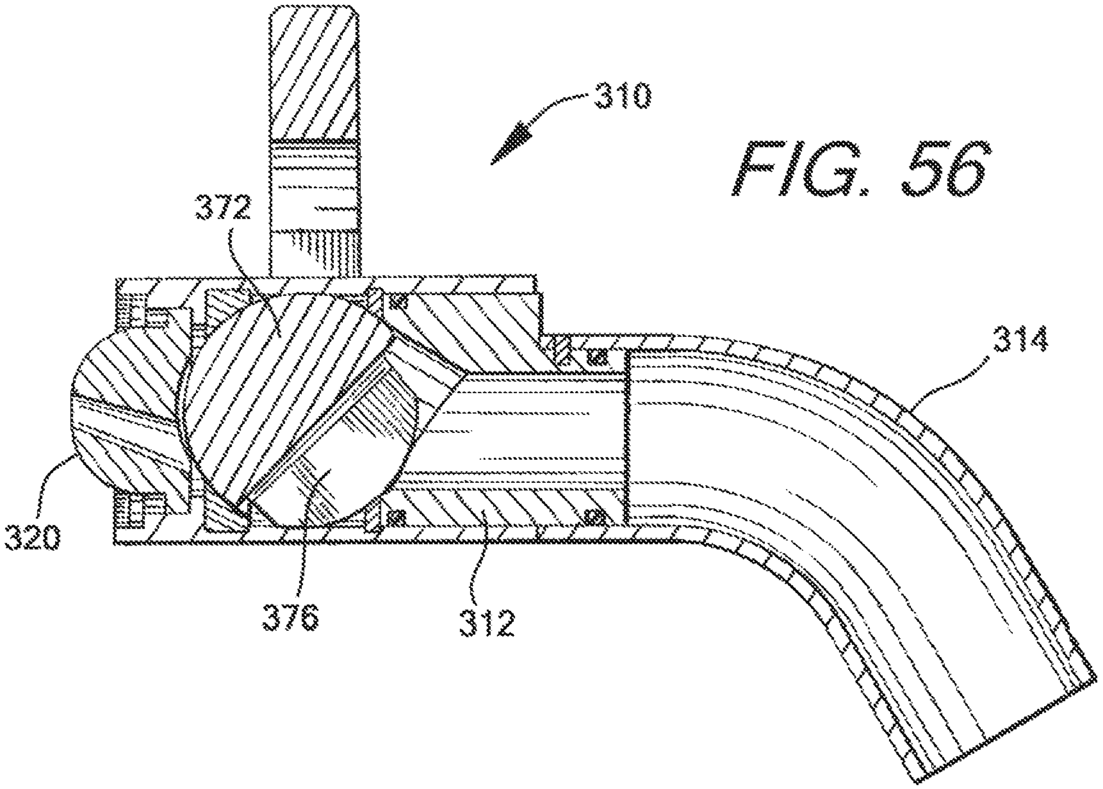
FIG. 56
FIG. 57
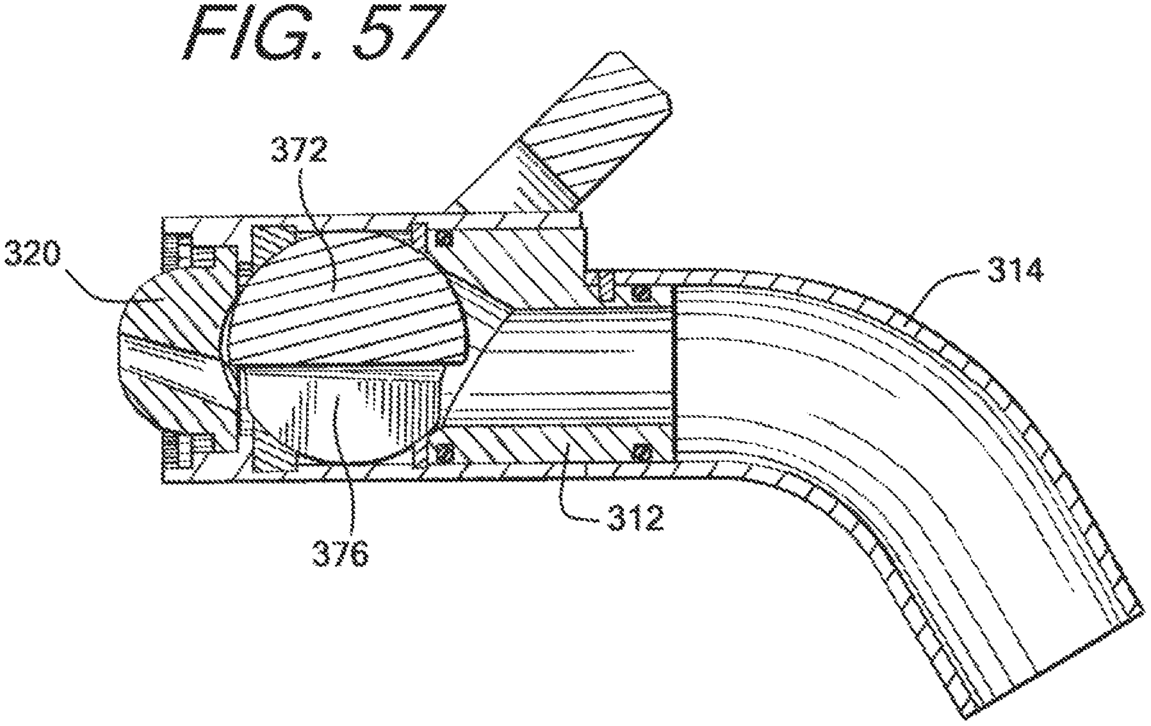

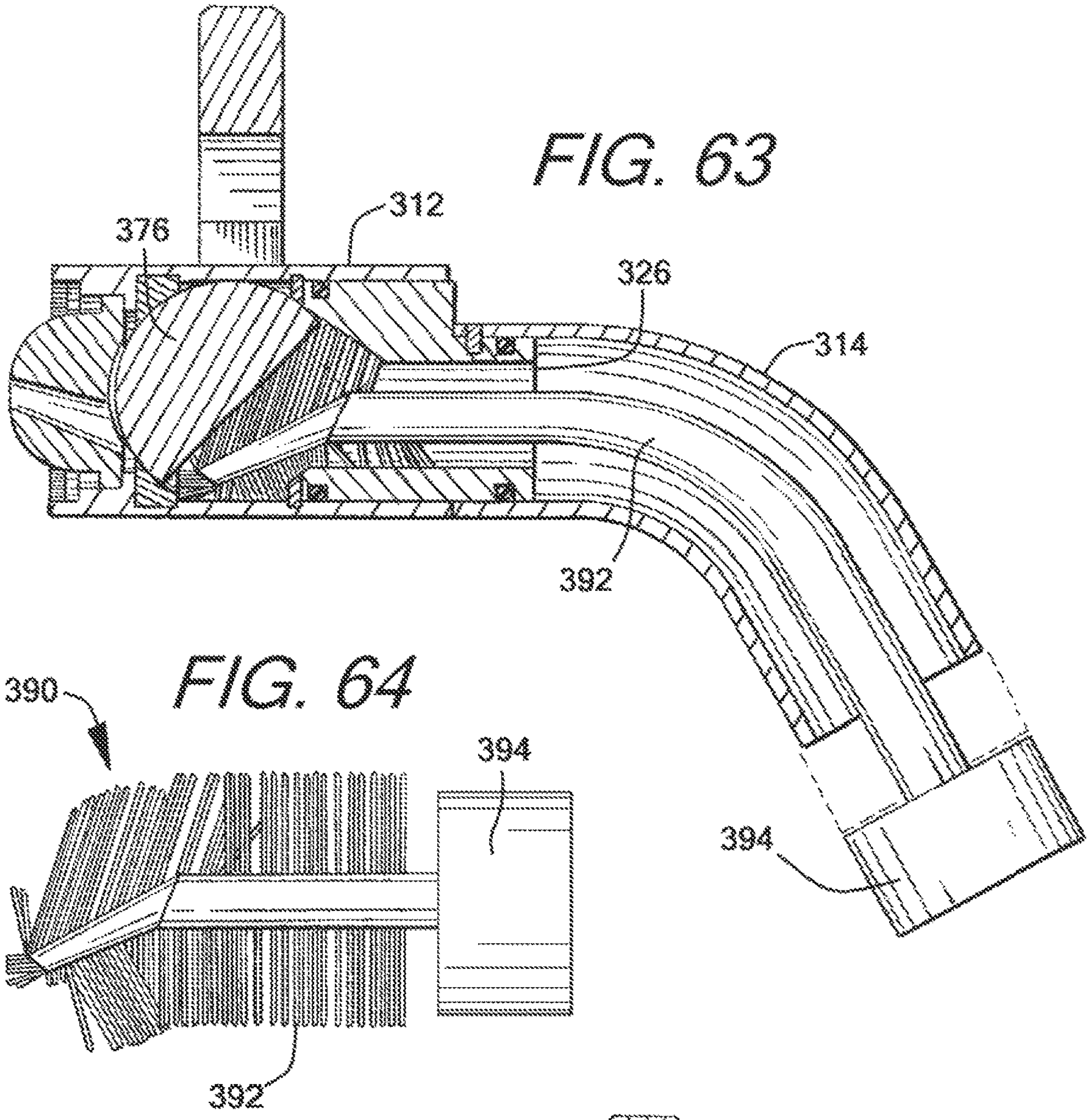
FIG. 63
FIG. 64
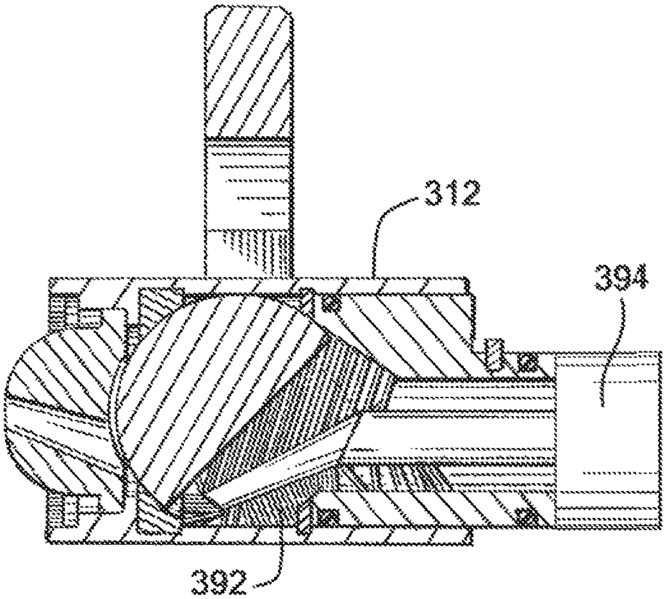
FIG. 65

BEVERAGE DISPENSING SYSTEM

CROSS-REFERENCE TO RELATED APPLICATIONS

The present application is a continuation of U.S. patent application Ser. No. 16/922,237, filed on Jul. 7, 2020, which is a continuation of U.S. patent application Ser. No. 16/175,542, filed on Oct. 30, 2018, now U.S. Pat. No. 10,703,620, which is a continuation-in-part application of U.S. patent application Ser. No. 15/091,570, filed on Apr. 6, 2016, now U.S. Pat. No. 10,144,630 and also claims the benefit of U.S. Patent Application No. 62/143,766, filed on Apr. 6, 2015, which applications are incorporated by reference herein and made a part hereof.

FEDERALLY SPONSORED RESEARCH OR DEVELOPMENT

None.

TECHNICAL FIELD

The invention relates generally to a beverage dispensing system and, in particular, to a dispensing faucet used in a beer dispensing system.

BACKGROUND OF THE INVENTION

Beverage dispensing systems such as a pressurized beer dispensing system for dispensing beer for human consumption are generally known in the art. A beer dispensing system, often in a commercial setting such as a bar, tavern or restaurant and the like, may generally include a plurality of kegs, compressed gas tanks, various supply lines, pressure regulators etc. and a plurality of dispensing faucets.

A beer keg is generally made from metal such as stainless steel or aluminum and contains a large quantity of beer to be dispensed over time. A compressed gas tank is operably connected to the keg to force the beer from the keg. CO2 gas is typically used rather than compressed air as the CO2 gas allows the beer in the keg to remain fresh for a longer period of time than if compressed air were used. Pressure regulators are used to control the pressure of the gas, which can be customized for the particular type of beer contained in the keg. A delivery line or supply line has a first end connected to the keg, an intermediate segment and a second end having a shank connector. The dispensing faucet is typically directly connected to the shank connector. The beer kegs(s) are often housed in a refrigerated room remote from the location of the dispensing faucet that is located at the bar area of the commercial establishment. Thus, the intermediate segment of the supply line may have a considerable length extending between the beer keg and the dispensing faucet. The dispensing faucet has a housing containing internal valve components and an external lever/handle. Displacement of the handle opens the valve wherein the liquid beer is dispensed into a glass/mug via the pressurized gas.

With the use of pressurized gas to force the beer from the keg and out of the dispensing faucet, the overall pressure in the system must be regulated to assure proper dispensing of the beer while minimizing foaming of the beer. Temperature of the beer must also be controlled. Excessive foaming of the beer leads to waste as the foam is discarded, and can also adversely affect the taste of the beer. In current dispensing faucets, the connection structure to the shank connector results in undesired turbulent flow from the shank connector to an inlet of the dispensing faucet. The liquid beer is subjected to a significant volume increase as the beer flows from a more narrow passageway of the shank connector to a larger area of an inlet of the dispensing faucet. The turbulent flow promotes more foaming of the beer as the beer is dispensed from the faucet. As a result, operators often attempt to employ other methods in the system to minimize foam and increase efficiency of the beer dispensing system. These methods can add to the cost of operation of the system. In addition, current faucet designs can also lead to stagnant liquid within the faucet that can contribute to an uncleanly system.

While such beer dispensing systems and dispensing faucets according to the prior art provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides a beverage dispensing system having a dispensing faucet providing an enhanced connection structure to a shank connector of the beverage dispensing system.

According to a first aspect of the invention, the beverage dispensing system has a housing having a first a first end and a second end. The housing further has a valve member operably connected in the housing between the first end and the second end. The housing has an extension member or protrusion that extends from the first end and is dimensioned and configured to be aligned with and connected to a passageway of a shank connector. The system further includes a spout having an inlet connected to the second end of the housing. The nozzle has a distal end defining an outlet of the spout.

According to a further aspect of the invention, the protrusion and passageway of the shank connector are dimensioned to minimize any volume change as a liquid beverage flows through the shank connector and housing.

According to a further aspect of the invention, the central conduit is downwardly sloped through the housing of the faucet from the inlet opening and towards the outlet opening. The central conduit may also have an internal diameter that increases in size from the inlet opening towards the outlet opening.

According to another aspect of the invention, a valve seat is defined in the central conduit. The valve seat is defined closer to the inlet opening than to the outlet opening. Thus, the distance from the inlet opening to the valve seat along the central conduit is less than the distance from the valve seat to the outlet opening along the central conduit.

According to another aspect of the invention, the spout is removably connected to the housing. The spouts may have differently lengths or internal conduit dimensions. The spout may have a specialty configuration to provide an enhanced pour into a specialty vessel such as a growler type vessel.

According to another aspect of the invention, valve member is a ball type valve. When the valve assembly is in an open faucet position, the central conduit is unobstructed.

According to a further aspect of the invention, a brush assembly having a cap member may be used with the dispensing faucet.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 4*a* is an exploded side elevation view of a prior art dispensing faucet and shank connector;

FIG. 4*b* is a perspective view of an internal portion of the shank connector and showing an internal conduit in communication with a larger volume portion;

FIG. 4*c* is a side elevation view of the prior art dispensing faucet and shank connector shown in FIG. 4*a* and schematically showing a turbulent beverage flow from the shank connector to the dispensing faucet;

FIG. 5 is a perspective view of dispensing faucet according to an exemplary embodiment of the present invention;

FIG. 6 is an exploded view of the dispensing faucet of FIG. 5 and also showing a cleaning nozzle;

FIG. 7 is a side elevation view of the dispensing faucet of FIG. 5;

FIG. 8 is a side elevation view of the dispensing faucet of FIG. 5 and having the cleaning nozzle connected thereto;

FIG. 17 is a perspective view of a spout of the dispensing faucet;

FIG. 18 is a top view of the spout of the dispensing faucet;

FIG. 19 is front view of the spout of the dispensing faucet;

FIG. 20 is a side elevation view of the spout of the dispensing faucet;

FIG. 21 is a rear view of the spout of the dispensing faucet;

FIG. 22 is a perspective view of a cleaning nozzle used with the dispensing faucet in an exemplary embodiment of the present invention;

FIG. 23 is a top view of the cleaning nozzle;

FIG. 24 is a side elevation view of the cleaning nozzle;

FIG. 56 is a cross-sectional view of the dispensing faucet of FIG. 45 and having an alternative valve member in a closed position;

FIG. 57 is a cross-sectional view of the dispensing faucet of FIG. 45 and having the alternative valve member in an open position;

FIGS. 62-65 are side elevation views of brush assemblies.

DETAILED DESCRIPTION OF THE PREFERRED EMBODIMENT

Figure 1:
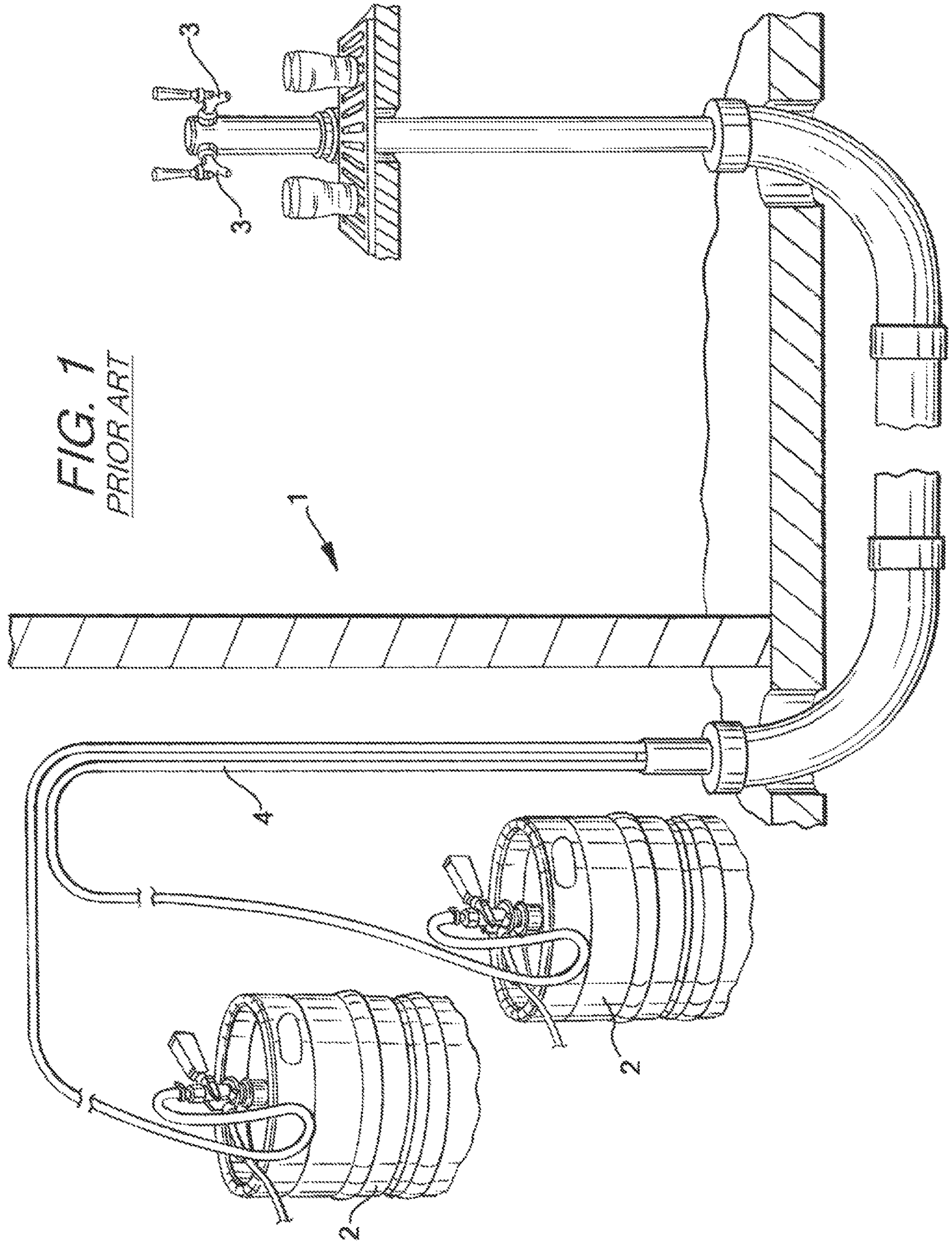
FIG. 1 PRIOR ART
FIG. 1 is a schematic view of a conventional beverage dispensing system.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
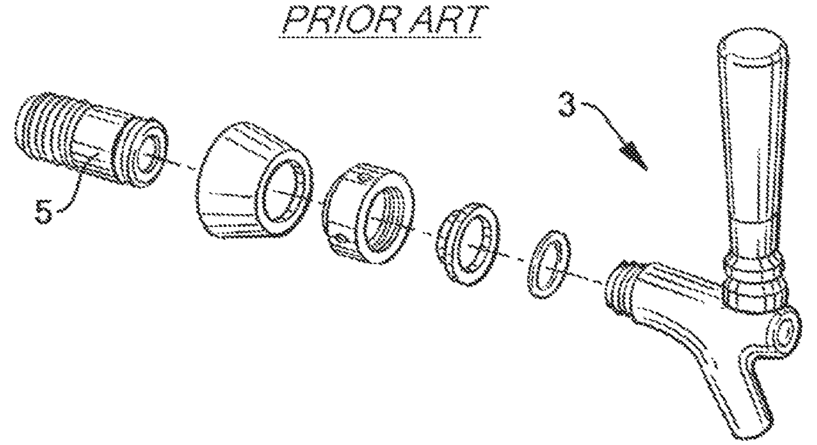
FIG. 2 PRIOR ART
FIG. 2 is an exploded view of a prior art dispensing faucet and a shank connector.

Referring to the drawings, FIG. 1 discloses a conventional beverage dispensing system generally designated with the reference numeral 1. The beverage dispensing system 1 generally includes a beverage source such as in the form of a beer keg 2 and a dispensing faucet 3. The beer keg 2 is in fluid communication with the dispensing faucet 3 via a supply line 4. Pressurized gas such as CO2 may also be introduced into the system 1. It is understood that the beer keg 2 may be in a remote location from the dispensing faucet 3 such as in a bar/restaurant setting wherein the beer kegs 1 may be stored in a refrigerated lower level room. It is further understood that the beverage dispensing system 1 may be considered to have a single beer keg, but typically has a plurality of beer kegs 1 in fluid communication with a plurality of respective dispensing faucets 3 via a plurality of respective supply lines 4. While the beverage dispensing system 1 is typically used to dispense beer, the system 1 can also be used to dispense other beverages. FIGS. 2-4 further show the dispensing faucet 3 connected to a shank connector 5. Manipulation of a handle 6 of the dispensing faucet 3 opens and closes a valve structure 7 of the faucet 3 to control flow of beer through the faucet 3. As further shown in FIGS. 4*a* and 4*b*, when the valve structure 7 is opened, the liquid beverage travels through a passageway 8 in the shank connector 5 and into an inlet 9 of the faucet 3, as well as proceeds through the outlet of the faucet 3. As can be appreciated from FIG. 4*b*, the volume of the passageway 8 is less than the volume proximate the distal end of the shank connector 5 where the inlet of the dispensing faucet is connected. The passageway 8 opens into a larger generally hemispherical volume portion. The larger volume portion may also be considered dome-shaped or cone-shaped etc. The volume also increases from the passageway 8 of the shank connector 5 with respect to the inlet of the faucet 3. It is understood that the shank connector 5 has a connecting member 11 in the form of a threaded member that cooperates with connection structure of the faucet typically in the form of a threaded member. Thus, the threaded members mate to connect the shank connector to the faucet. The increase in volume causes a more turbulent flow of the pressurized liquid beverage which can cause excess foaming and other undesirable effects and causing the implementation of other costly and cumbersome corrective actions. As described below, an enhanced dispensing faucet can be used in the beverage dispensing system to provide enhanced operability.

FIGS. 5 and 6 disclose a dispensing faucet of an exemplary embodiment of the present invention, generally designated with the reference numeral 10. The dispensing faucet 10 generally includes a housing 12 and a spout 14. As explained in greater detail below, a cleaning nozzle 16 may also be used in certain exemplary embodiments of the dispensing faucet 10. As can be appreciated from FIGS. 5-8, the nozzle 16 is configured to be removably attached to the housing 12. The nozzle 16 can then be removably attached to the housing 12 for easy cleaning of the housing 12 and other portions of the system 1.

Figure 14:
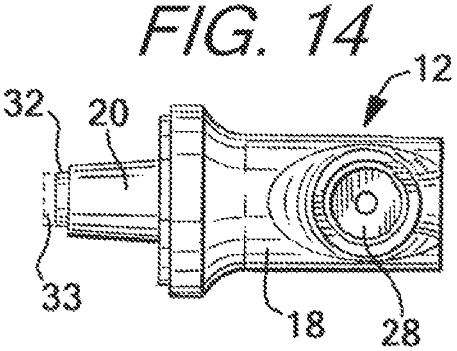
FIG. 14 is a top plan view of the housing of the dispensing faucet.
Figure 15:
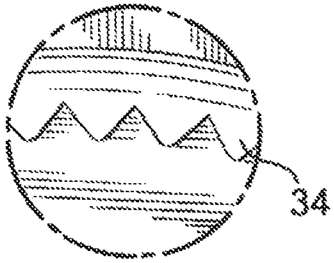
FIG. 15 is an enlarged view of a rear view shown in FIG. 11.
Figure 16:
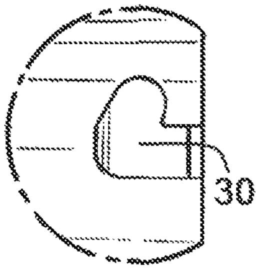
FIG. 16 is an enlarged view of a slot shown in FIG. 10.

FIGS. 9-16 further show the housing 12 of the dispensing faucet 3. The housing 12 generally includes a main body structure 18 and having a protrusion 20, extension member 20 or nipple 20 extending from the body 18. The extension member 20 or protrusion 20 cooperates with the body 18 to define a central conduit 22 therethrough. The central conduit 22 has an inlet opening 24 defined by a distal end of the protrusion 20, and the central conduit 22 further has an outlet opening 26 defined by the body 18. The body 18 further has a top aperture 28 that is configured to receive the handle 6 of the faucet 10. It is understood that the handle 6 cooperates with an internal valve structure 29 operably associated with the housing 12 to open and close the faucet. Different valve structures could be used. In one exemplary embodiment, a butterfly valve structure is utilized. The valve structure is located proximate a central location of the housing 12 as can be appreciated FIG. 13. This location assists in providing a design that distributes forces associated with valve actuation throughout the housing 12 thus minimizing stress point locations that can lead to premature faucet failure. As shown in FIG. 16, the body 18 further has a pair of slots 30 for cooperation with structures on the spout 14 to be described.

In an exemplary embodiment, the protrusion 20 has a length that extends beyond the peripheral structure defined by the body 18. The distal end of the protrusion 20 defines a seat 32 to cooperate with the shank connector 5 to be described. The body 18 further has connection structure 34 as shown in FIG. 15 that connects the housing 12 to the shank connector 5. The protrusion 20 uniquely cooperates with the shank connector 5 to provide an enhanced connection as described in greater detail below.

FIGS. 18-21 further show the spout 14 of the dispensing faucet 3. The spout 14 has a generally curved body structure 40. The body 40 defines a spout inlet 42 and a spout outlet 44 and has a fluid conduit 48 therebetween. The body 40 has a pair of spout pins 46 proximate the inlet 42. The spout pins 46 are designed to cooperate with the slots 30 of the housing 12 to be described in greater detail below. It is understood that the spout 14 can take on various different contours and vary in length as desired. A length and curved configuration of the spout 14 may be set based on the type of liquid beverage to be dispensed from the dispensing faucet 3. The size of the fluid conduit 48 could also be varied as desired.

FIGS. 22 and 23 further show the cleaning nozzle 16 used with the dispensing faucet 3. As discussed, the cleaning nozzle 16 is used to clean the housing 12 of the faucet 10 and other portions of the system 1. The spout 14 is removed before the nozzle 16 is attached to the housing 12. The nozzle 16 has a base 50 and a cleaning tip 52 extending from the base. The cleaning tip 52 has a plurality of ridges 54 spaced along the tip 52. The cleaning nozzle 16 defines a nozzle inlet 56 proximate the base 50 and a nozzle outlet 58 proximate a distal end of the cleaning tip 52 wherein a cleaning conduit 60 extending therethrough. The cleaning nozzle 16 has a pair of nozzle pins 62 designed to cooperate with the slots 30 of the housing 12 to be described in greater detail below. In an exemplary embodiment, the cleaning tip 52 extends generally straight from the base 50 although other configurations are possible as desired.

In preparation for operation of the beverage dispensing system 1, it is understood that the beverage source such as in the form of beer kegs are tapped with the supply line and pressurized gas source as is customary. The supply line 4 has a respective shank connector 5 that is mounted at a bar location. The housing 12 of the dispensing faucet 10 is connected to the shank connector 5 via the connection structure 34 cooperating with the shank connector 5. In this connection, the protrusion 20 is positioned in confronting relation and engaged with an outlet of the passageway 8 of the shank connector. As shown in FIG. 14, the valve seat 32 of the protrusion 20 may also have a sealing member such as in the form of a resilient O-ring 33 that engages against the passageway 8. Accordingly, the outlet of the passageway 8 of the shank connector is in fluid communication with the inlet opening 24 of the housing 12. The O-ring 33, if employed, assists in providing a fluid tight seal between the passageway 8 of the shank connector 5 and the inlet opening 24 defined by the protrusion 20. The spout 14 is also connected to the housing 12. The spout pins 46 are received by the slots 30 on the housing 12 and rotated slightly wherein the spout 14 is connected to the housing 12. When a user engages the handle 6 to open the valve structure in the housing 12, the liquid beverage flows through the dispensing faucet 10.

Figure 25:
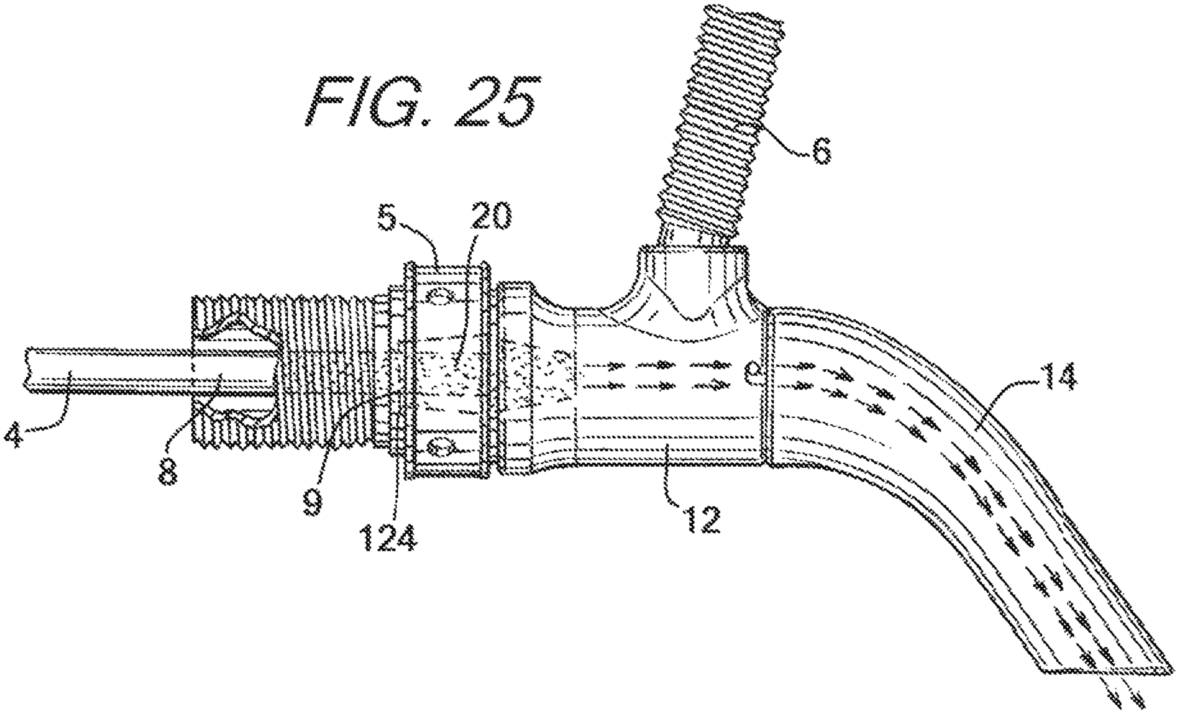
FIG. 25 is a cross-sectional view of the dispensing faucet of FIG. 5 connected to the connector shank.
Figure 26:
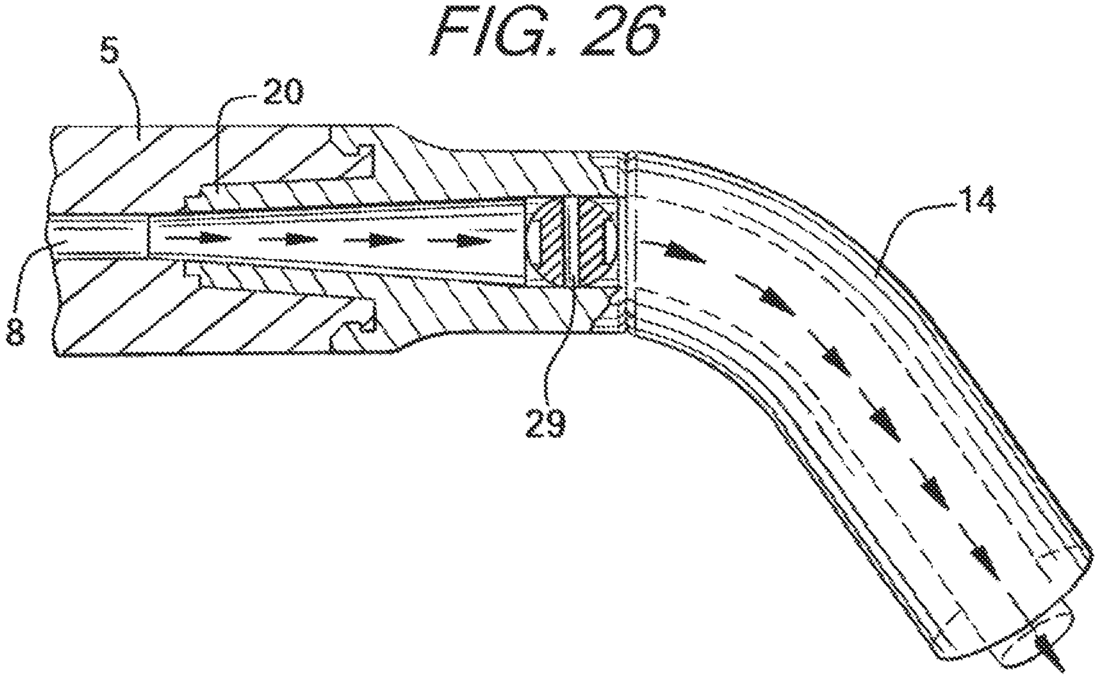
FIG. 26 is a cross-sectional view of the dispensing faucet similar to the faucet of FIG. 5 connected to a shank connector and showing flow through the dispenser.
Figure 27:
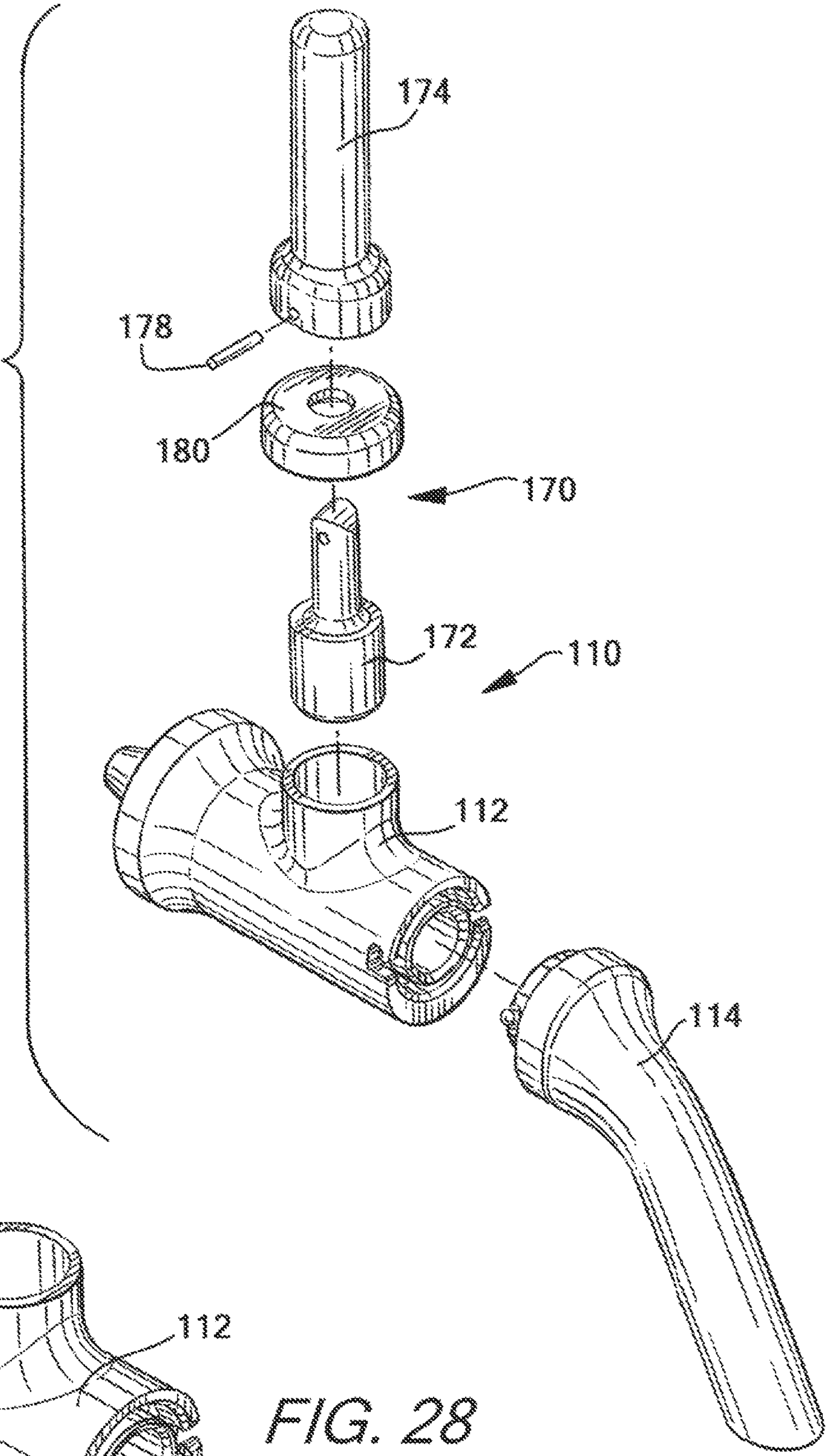
FIG. 27 is an exploded view of another embodiment of the dispensing faucet according to the present invention.
Figure 28:
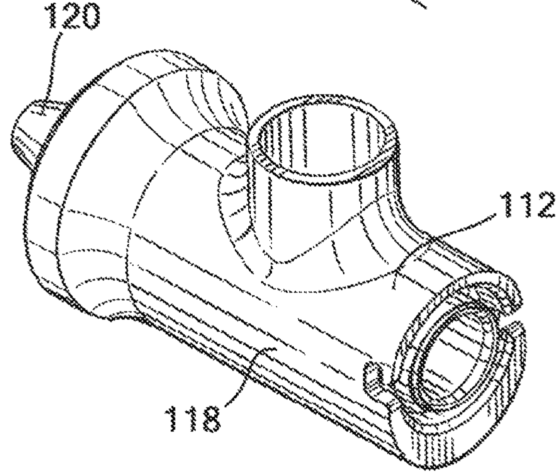
FIG. 28 is a perspective view of a housing of the dispensing faucet of FIG. 27.

The dispensing faucet 10 provides significant enhancements in the operation of the beverage dispensing system 1. As shown in FIGS. 25 and 26, the protrusion 20 is aligned and in confronting relation with the passageway 8 of the shank connector 5. The protrusion 20 is structured and dimensioned such that there is a fluid tight fit between the end of the passageway 8 defined by the shank connector 5 and the inlet opening 24 defined by the protrusion 20. The O-ring 33 may assist in this connection. As further can be appreciated from the FIGS., the passageway 8 and the central conduit 22 defined by the protrusion 20 are dimensioned such that the respective volumes are similar. With generally similar volumes, when the valve structure of the dispensing faucet 10 is opened and the liquid beverage flows through the faucet 10, a more laminar flow of the liquid beverage is achieved through the faucet 10. Accordingly, a smoother pour from the spout 14 is achieved and having less foam. FIG. 26 schematically shows a more laminar flow achieved with the dispensing faucet constructed in accordance with the present invention. Thus, the cooperation between the protrusion 20 and shank connector 5 provides an enhanced flow control connection for the stream of liquid beverage that passes through the dispensing faucet 3 when the valve structure is opened. Pressurized fluid expansion is minimized at the dispensing faucet 10. It is understood that the protrusion structure 20 could take various forms to control the volume of the liquid beverage proximate the interface between the shank connector 5 and the dispensing faucet 10. For example, the outer periphery of the protrusion 20 could be contoured in a convex configuration to be in confronting relation to a concave configuration of the inner portion of the shank connector 5. Other mating configurations for a confronting relation are also possible. In certain exemplary embodiments, the dispensing faucet 10 of the present invention dispenses a liquid beverage generally at a flow rate of 1 gallon/minute, at an operating temperature of 32-38 degrees F., and at an operating pressure of 14-24 psi. The dispensing faucet 10 may further have an inlet dimension of 3⁄16 in. In further exemplary embodiments, the dispensing flow rate may be ½ gallon/minute to more than 4 gallons/minute. Other faucet inlet dimensions are also possible such as 3⁄16 in., ¼ in., 5⁄16 in., ⅜ in. as well as other dimensions. In a further exemplary embodiment, the dispensing faucet 10 is primarily constructed of stainless steel. Other materials can also be used.

The beverage dispensing system 1 can also be more easily cleaned. As shown, for example in FIGS. 7 and 8, the spout 14 is easily removed by a slight turn wherein the spout pins 46 can pass from the slots 30 of the housing 12 to disconnect the spout 14 from the housing 12. Open areas of the housing 12 can be cleaned as necessary. As shown in FIG. 8, the cleaning nozzle 16 is attached to the housing 12 wherein the nozzle pins 62 fit into the slots 30. A cleaning line can be attached to the cleaning tip 52 of the cleaning nozzle 16, and cleaning fluid can be injected through the dispensing faucet 3, shank connector 5 and other portions of the supply line 4.

FIGS. 27-43 disclose another embodiment of the dispensing faucet of the present invention. Similar structures will be designated with similar reference numerals in a 100 series of reference numerals. The above description of similar structures also apply to this embodiment.

The dispensing faucet shown in FIGS. 27-43 is generally designated with the reference numeral 100. The dispensing faucet 100 generally includes a housing 112 and a spout 114. As described in greater detail below, it is understood that the cleaning nozzle 16 of FIGS. 22-24 can also be used with the dispensing faucet 100 of FIGS. 27-43. As can be appreciated from FIGS. 5-8, the nozzle 16 is configured to be removably attached to the housing 112. The nozzle 16 can then be removably attached to the housing 112 for easy cleaning of the housing 112 and other portions of the system 1.

FIGS. 28-33 further show the housing 112 of the dispensing faucet 100. The housing 112 generally includes a main body structure 118 and having a protrusion 120, extension member 120 or nipple 120 extending from the body 118. The extension member 120 or protrusion 120 cooperates with the body 118 to define a central conduit 122 therethrough. The central conduit 122 has an inlet opening 124 defined by a distal end of the protrusion 120, and the central conduit 122 further has an outlet opening 126 defined by the body 118. As further shown in FIG. 33, the central conduit 122 has a generally angled configuration through the housing 112, or through a portion of the housing 112. As the housing 112 is typically mounted in a generally horizontal configuration, the central conduit 122 has a portion that is angled downwardly from the inlet opening 124 towards the outlet opening 126. Thus, the housing 112 has a lowermost floor 119 across the housing 112 wherein the inlet opening 124 is positioned at a greater distance from the floor 119 than the distance of the portion of the central conduit 122 towards the outlet opening 126 from the floor 119. With the housing 112 positioned in a generally horizontal configuration, the central conduit 122 generally slopes downwards from the inlet opening 124 and towards the outlet opening 126. In such configuration and as discussed further below, liquid in the central conduit 122 naturally drains from the inlet opening 124 towards the outlet opening 126. In an exemplary embodiment, the central conduit 122 is configured to slope downwardly from the inlet opening 124 through the housing 112 and to the outlet opening 126 wherein liquid will drain naturally via gravity and flow out of the spout 114 and out of the system 1. It is understood that the downward slope of the central conduit 122 can vary as desired wherein certain embodiments may have a greater slope than other designs where the slope is more gradual. In addition, in certain exemplary embodiments, the central conduit 122 may have an internal dimension that varies along the length of conduit 122. For example, the inner dimension may gradually increase as the conduit 122 extends towards the outlet opening 126. The inner dimension, such as an inner diameter, may increase from the inlet opening 124 to the outlet opening 126. As further shown in FIG. 33, the central conduit 122 further defines a valve seat 123 in the housing 112. The valve seat 123 is dimensioned to cooperate with the valve stem 172 as further described below.

Figure 34:
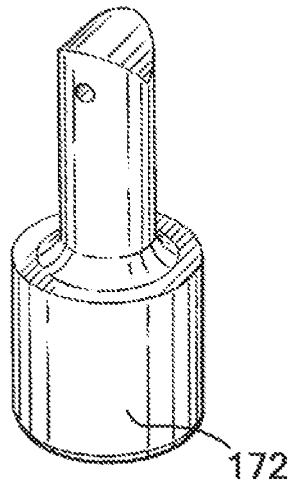
FIG. 34 is a perspective view of a valve stem of the dispensing faucet of FIG. 27.
Figure 35:
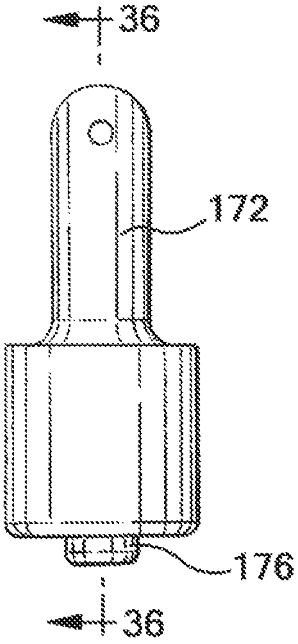
FIG. 35 is a side elevation view of the valve stem.
Figure 36:
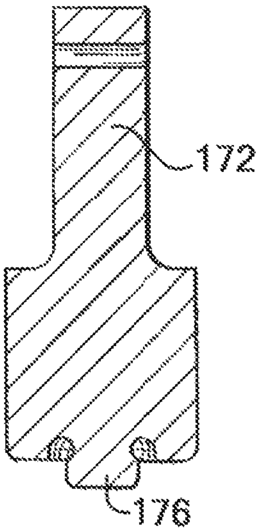
FIG. 36 is a cross-sectional view of the valve stem taken along line 36-36 in FIG. 35.
Figure 37:
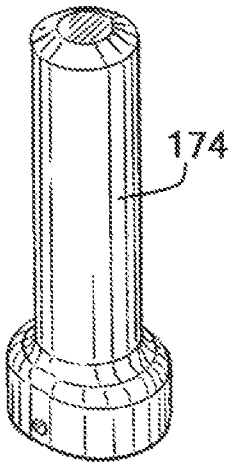
FIG. 37 is a perspective view of a cam handle of the dispensing faucet of FIG. 27.
Figure 38:
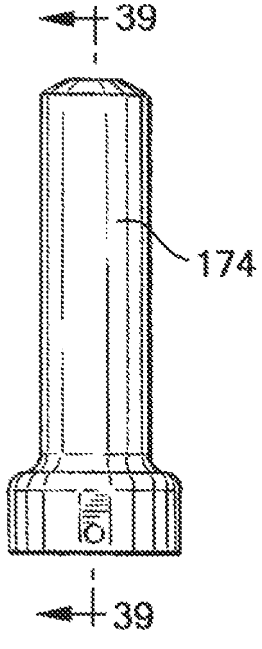
FIG. 38 is a side elevation view of the cam handle.
Figure 39:
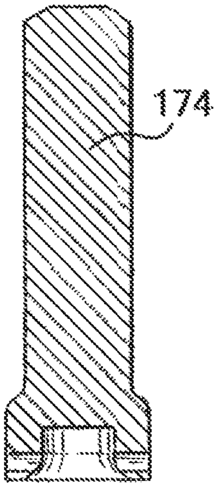
FIG. 39 is a cross-sectional view of the cam handle taken along lines 39-39 in FIG. 38.
Figure 42:
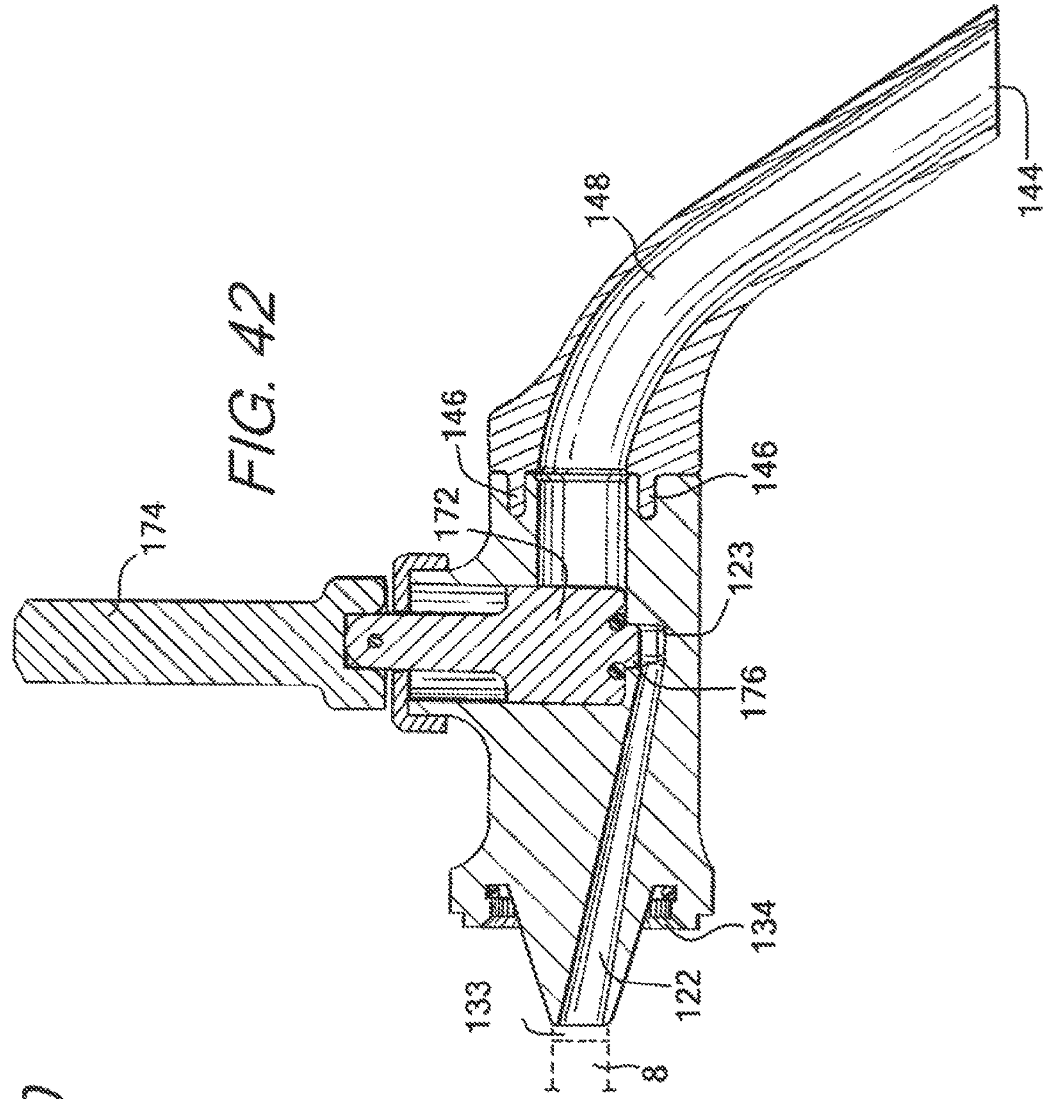
FIG. 42 is a cross-sectional view of the dispensing faucet of FIG. 27 and showing the dispensing faucet in a closed position.

The body 118 further has a top aperture 128 that is configured to receive a valve assembly 170 of the faucet 110. It is understood that the valve assembly 170 cooperates with the housing 112 to open and close the dispensing faucet 110. As previously disclosed, different valve structures could be used including butterfly or ball valve structures. In this exemplary embodiment and as shown in FIGS. 27 and 34-39, the valve assembly 170 has a valve stem 172 and a cam handle 174. The valve assembly 170 is located proximate a central location of the housing 112 as can be appreciated FIG. 27. This location assists in providing a design that distributes forces associated with valve actuation throughout the housing 112 thus minimizing stress point locations that can lead to premature faucet failure. As shown in FIGS. 34-36, the valve stem 172 has a generally cylindrical configuration that is dimensioned to be received by the top aperture 128. The valve stem 172 has a depending protrusion 176 extending from a bottom end of the valve stem 172. The depending protrusion 176 is dimensioned to mate with the valve seat 123 of the housing 112 to allow flow and cut-off flow through the housing 112, thus opening and closing the valve/faucet. It is understood that the depending protrusion 176 and valve seat 123 can have different mating configurations as desired. As shown in FIGS. 37-39, the cam handle 174 is generally cylindrical and cooperates with the valve stem 172. The cam handle 174 is pivotally connected to a distal end of the valve stem 172 opposite the depending protrusion 176 via a pin 178. The valve stem 172 and cam handle 174 each have openings to cooperatively receive the pin 178. As explained in greater detail below, actuation of the cam handle 174 moves the valve stem 172 upwards and away from the valve seat 123 (FIG. 43) and floor 119 to allow liquid flow through the faucet 110. As appreciated from FIG. 27, the faucet 110 may also have a cap 180 that fits over the top aperture 128.

Figure 29:
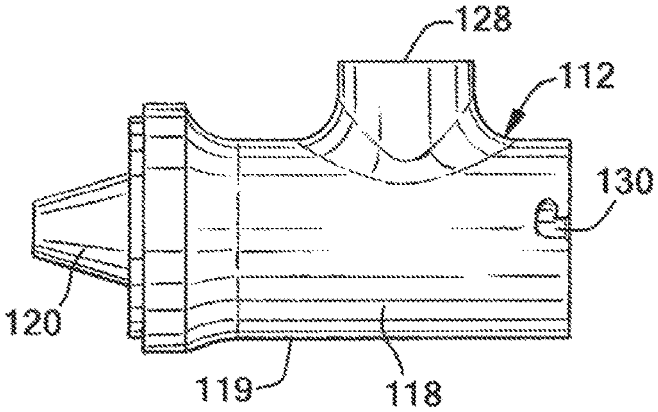
FIG. 29 is a side elevation view of the housing of the dispensing faucet.
Figure 30:
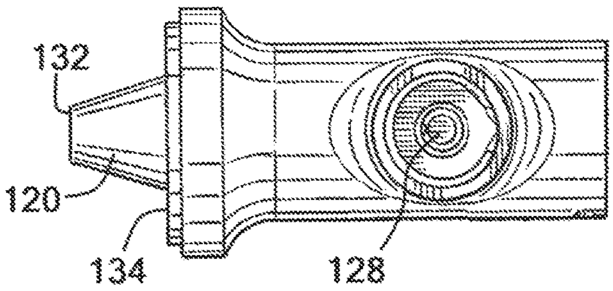
FIG. 30 is a top plan view of the housing of the dispensing faucet.
Figure 31:
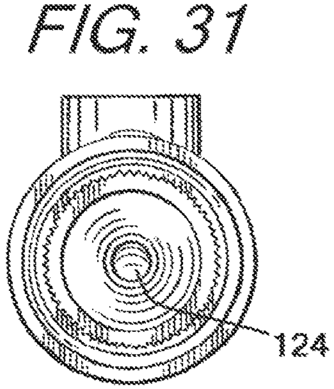
FIG. 31 is a rear view of the housing of the dispensing faucet.
Figure 32:
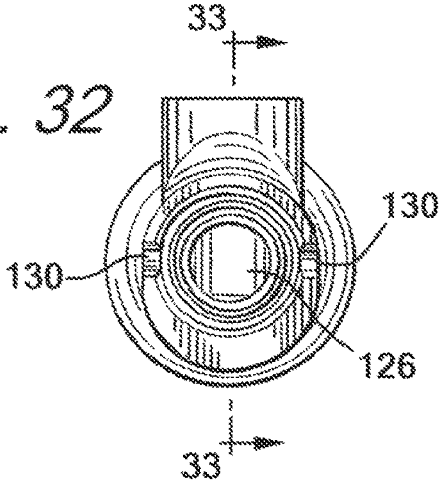
FIG. 32 is a front view of the housing of the dispensing faucet.
Figure 33:
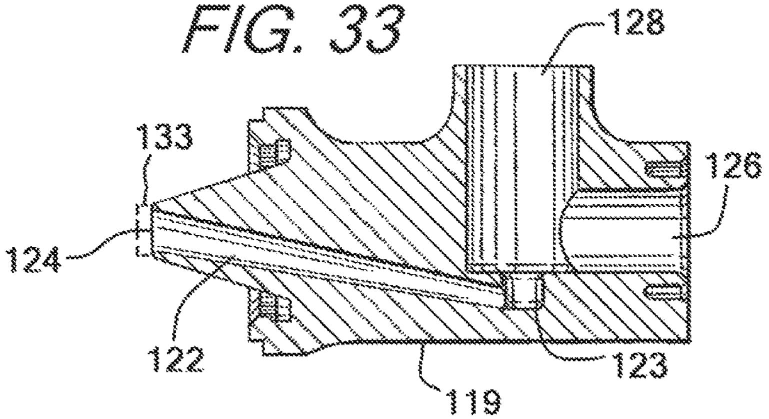
FIG. 33 is a cross-sectional view of the housing of the dispensing faucet taken along line 33-33 in FIG. 32.

As shown in FIG. 29, the body 118 further has a pair of slots 130 for cooperation with structures on the spout 114 to be described. The pins and slots 130 are configured to allow the spout 114 to be detachably connected to the housing 112.

In an exemplary embodiment, the protrusion 120 has a length that extends beyond the peripheral structure defined by the body 118. The distal end of the protrusion 120 defines a seat 132 to cooperate with the shank connector 5. The body 118 further has connection structure 134 that connects the housing 112 to the shank connector 5. The protrusion 120 uniquely cooperates with the shank connector 5 to provide an enhanced connection similar as described above. The distal end of the protrusion 120 defines the inlet opening 124 that is dimensioned to coincide or correspond to the internal passageway 8 of the shank connector 5. The inlet opening 124 is generally in confronting relation to the internal passageway 8. An O-ring may also be utilized as described above. With the inlet opening 124 generally similar in dimension with the outlet opening of the internal passageway 8, any volume expansion is minimized or eliminated, which promotes laminar flow as discussed herein.

Figure 40:
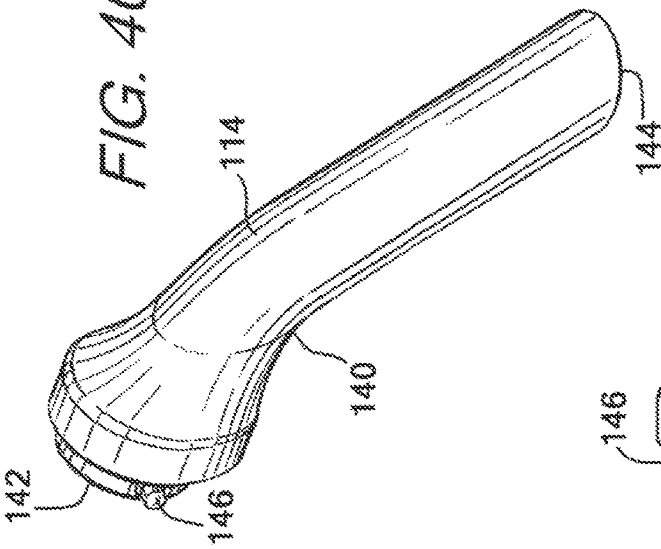
FIG. 40 is a perspective view of a spout of the dispensing faucet of FIG. 27.
Figure 41:
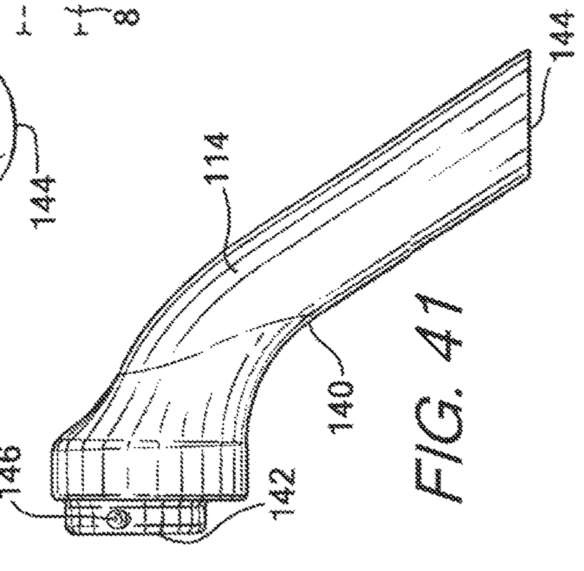
FIG. 41 is a side elevation view of the spout of the dispensing faucet.

FIGS. 40-41 further show the spout 114 of the dispensing faucet 100. The spout 114 is generally similar to the spout 14 shown in FIGS. 18-21. The spout 114 has a generally curved body structure 140. The body 140 defines a spout inlet 142 and a spout outlet 144 and has a fluid conduit 148 therebetween. The body 140 has a pair of spout pins 146 proximate the inlet 142. The spout pins 146 are designed to cooperate with the slots 130 of the housing 112. It is understood that the spout 114 can take on various different contours and vary in length as desired. A length and curved configuration of the spout 114 may be set based on the type of liquid beverage to be dispensed from the dispensing faucet 110. The size of the fluid conduit 148 could also be varied as desired. The fluid conduit 148 is further configured to allow further drainage of liquid from the sloped central conduit 122 of the housing 112. It is understood that kit could be provided with the faucets herein. The spout 114 could be comprised of a plurality of spouts 114 that are sized differently to accommodate different beverages being dispensed. The spouts 114 may have different lengths and/or differently-sized internal passageways. The spouts 114 may also be different to be used with different vessels such various types of glasses or growler type containers.

Figure 43:
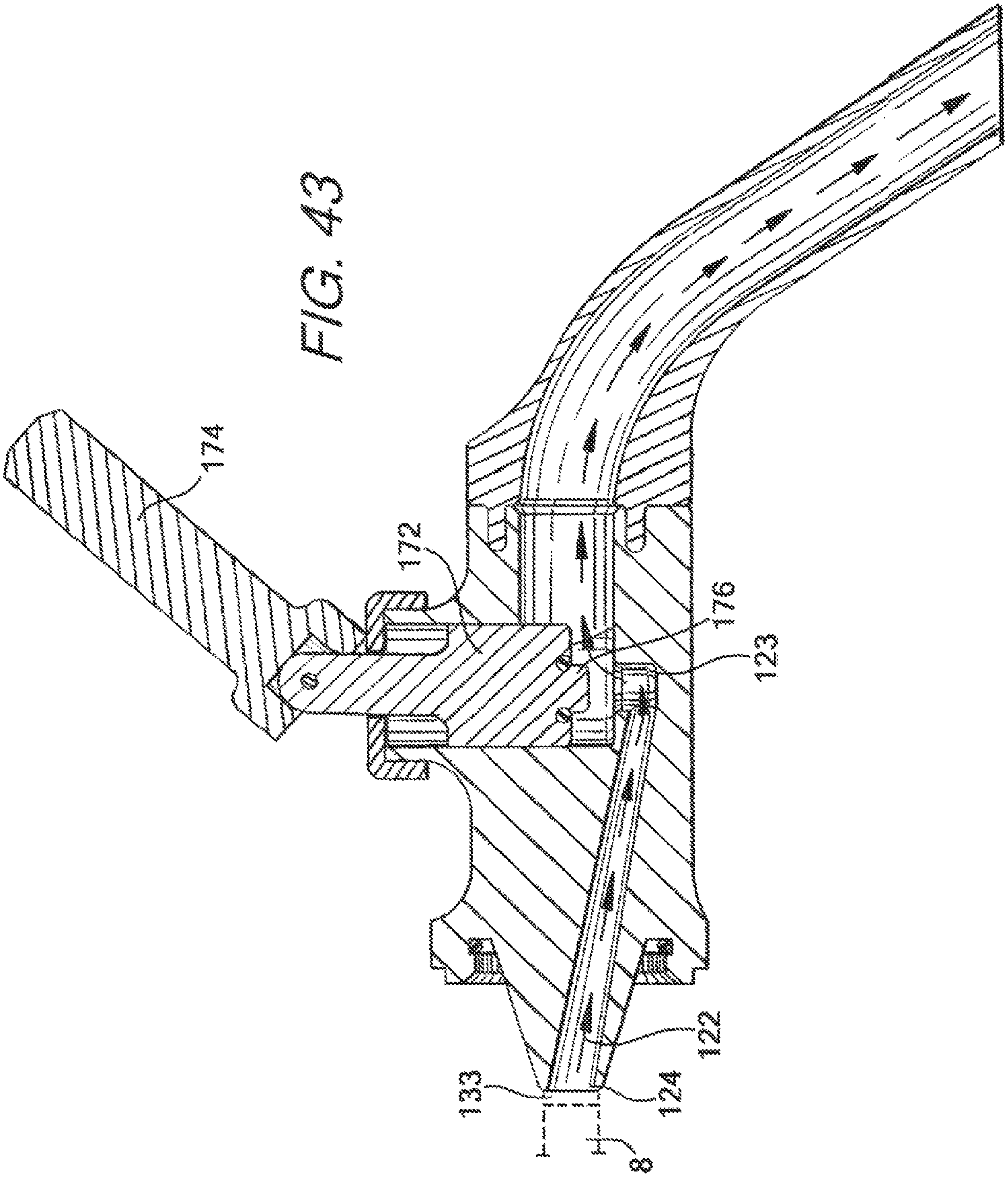
FIG. 43 is a cross-sectional view of the dispensing faucet of FIG. 27 and showing the dispensing faucet in an open position.

In preparation for operation of the beverage dispensing system 1, it is understood that the beverage source such as in the form of beer kegs are tapped with the supply line and pressurized gas source as is customary and shown in FIG. 1. The supply line 4 has a respective shank connector 5 that is mounted at a bar location. The housing 112 of the dispensing faucet 110 is connected to the shank connector 5 via the connection structure 34 cooperating with the shank connector 5. In this connection, the protrusion 120 is positioned in confronting relation and engaged with an outlet of the passageway 8 of the shank connector 5. As discussed, the inlet of the protrusion 120 may also have a sealing member such as in the form of a resilient O-ring 133 (FIG. 33) that engages against the passageway 8. Accordingly, the outlet of the passageway 8 of the shank connector 5 is in fluid communication with the inlet opening 124 of the housing 12. The O-ring 33, if employed, assists in providing a fluid tight seal between the passageway 8 of the shank connector 5 and the inlet opening 124 defined by the protrusion 120. The volume is generally maintained across the this connection between the shank connector 5 and the protrusion 120. The spout 114 is also connected to the housing 112. The spout pins 146 are received by the slots 130 on the housing 112 and rotated slightly wherein the spout 114 is connected to the housing 112. As shown in FIG. 43, when a user engages the cam handle 174 to displace the valve stem 172 and open the valve structure in the housing 112, the liquid beverage flows through the dispensing faucet 110. This defines an open faucet position. The user can further engage the cam handle 174 to return the valve stem 172 to a closed position wherein the depending protrusion 176 engages the valve seat 123 to define a closed faucet position.

The dispensing faucet 110 provides significant enhancements in the operation of the beverage dispensing system 1. Similar as shown in FIGS. 25 and 26, the protrusion 120 is aligned with and in confronting relation with the passageway 8 of the shank connector 5. The protrusion 120 is structured and dimensioned such that there is a fluid tight fit between the end of the passageway 8 defined by the shank connector 5 and the inlet opening 124 defined by the protrusion 120. The O-ring 133 may assist in this connection. As further can be appreciated from the figures such as FIG. 4*b* and FIGS. 42-43, the passageway 8 and the central conduit 122 defined by the protrusion 120 are dimensioned such that the respective volumes are similar. With generally similar volumes, when the valve assembly 170 of the dispensing faucet 110 is opened and the liquid beverage flows through the faucet 110, a more laminar flow of the liquid beverage is achieved through the faucet 110. Accordingly, a smoother pour from the spout 114 is achieved and having less foam. FIG. 26 schematically shows a more laminar flow achieved with the dispensing faucet 10 of the present invention and the dispensing faucet 110 would achieve the same laminar flow. Thus, the cooperation between the protrusion 120 and shank connector 5 provides an enhanced flow control connection for the stream of liquid beverage that passes through the dispensing faucet 110 when the valve assembly 170 is opened. Pressurized fluid expansion is minimized at the dispensing faucet 110. Because of the downwardly sloped configuration of the central conduit 122, once the valve assembly 170 is closed to stop liquid flow through the faucet 110, most of the liquid remaining in the conduit 122 will drain from the housing 112 and spout 114. Even to the extent any liquid accumulates at the valve seat 123, a significant portion of the liquid will drain naturally towards the outlet opening 126. This helps to minimize stagnant liquid in the housing 112 which leads to a less clean dispensing system 1.

The cleaning nozzle 16 shown in FIGS. 22-23 can be used with the dispensing faucet 100. As discussed, the cleaning nozzle 116 is used to clean the housing 112 of the faucet 100 and other portions of the system 1. The spout 114 is removed from the housing 112 and the cleaning nozzle 16 attached to the housing 112 (similar to the configuration as shown in FIG. 8).

Figure 44:
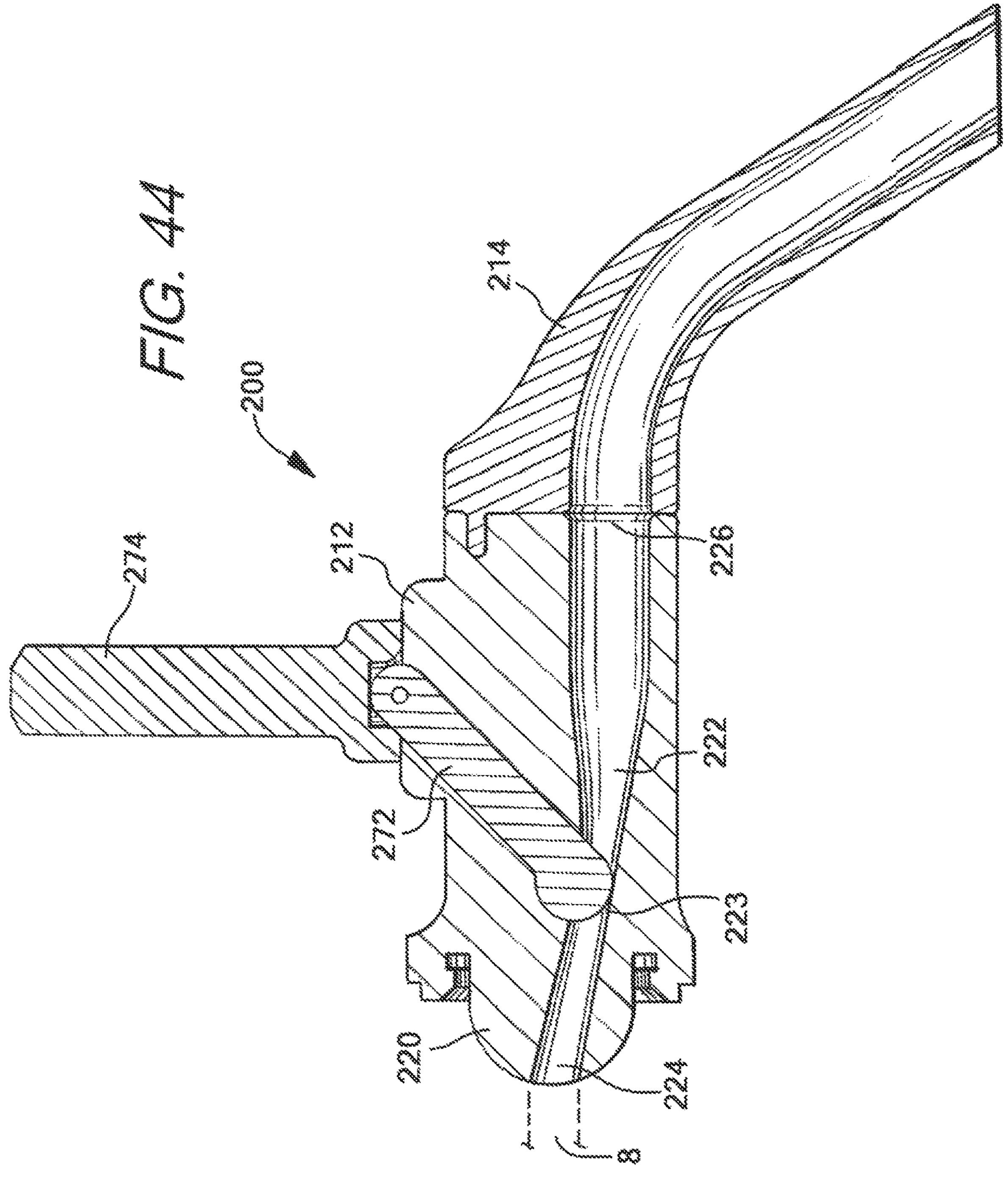
FIG. 44 is a cross-sectional view of another embodiment of the dispensing faucet of the present invention.
Figure 45:
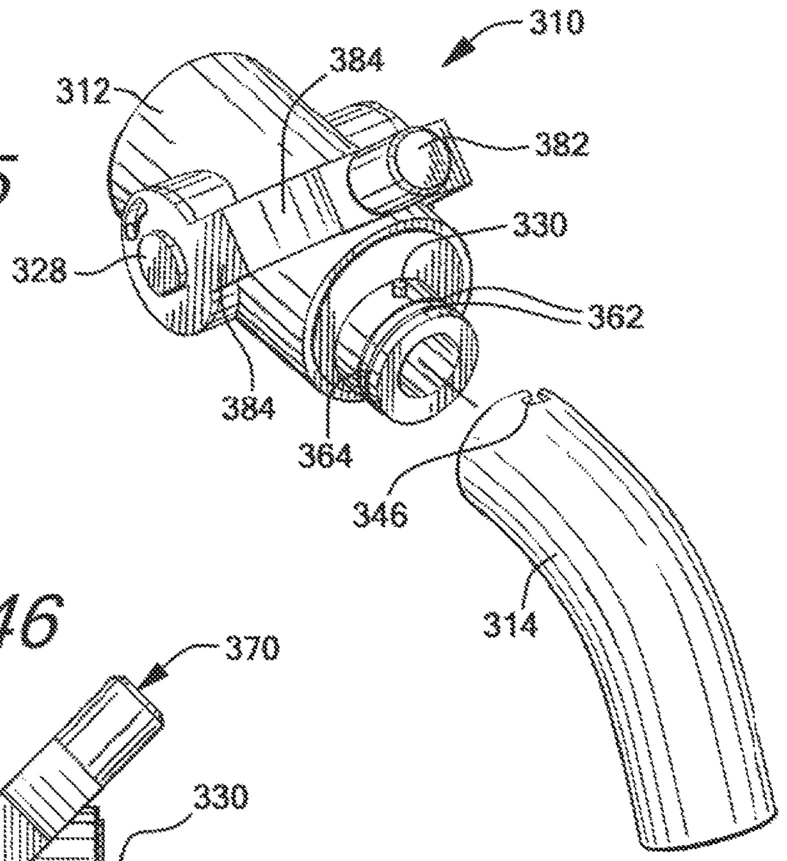
FIG. 45 is an exploded perspective view of another exemplary embodiment of the dispensing faucet of the present invention.
Figure 46:
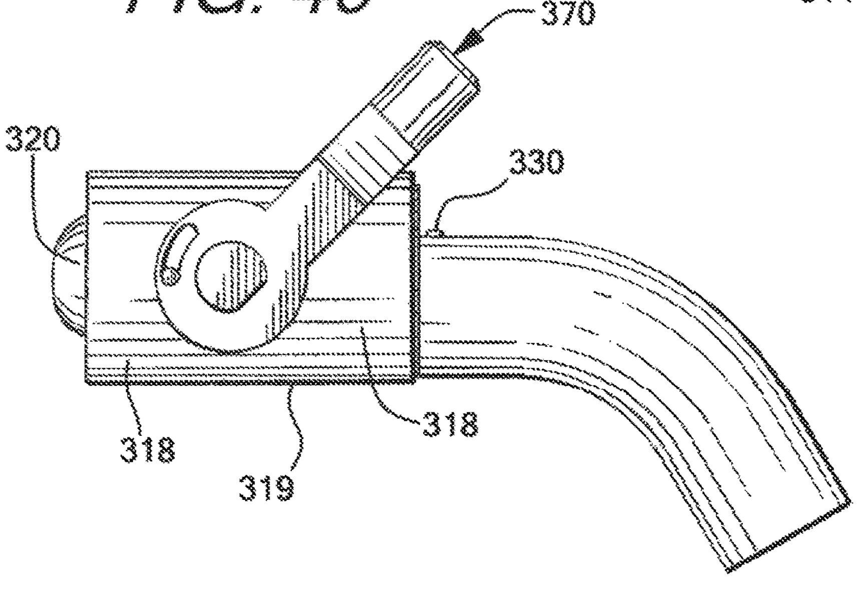
FIG. 46 is a side elevation view of the dispensing faucet of FIG. 45.

FIG. 44 discloses a further embodiment of the dispensing faucet generally designated with the reference numeral 200. The dispensing faucet 200 is similar to the dispensing faucet 100 of FIGS. 27-43. Similar structures are referenced with similar reference numerals in a 200 series. In this embodiment, the valve seat 223 defined in the central conduit 222 of the housing 212 is positioned more proximate the inlet opening 224. In this configuration, the valve stem 272 is positioned at an angle towards the inlet opening 224. The cam handle 274 is actuated to displace the valve stem 272 upwards to open the valve and allow flow through the housing 212. With the valve seat 223 positioned closer to the inlet opening 224, any liquid downstream of the valve seat 223 will automatically drain, via gravity, from the housing 212 and spout 214 upon closing of the valve assembly. This minimizes any stagnant liquid in the housing 212 which promotes cleanliness of the system 1.

FIGS. 45-65 disclose another exemplary embodiment of the dispensing faucet of the present invention including various accessory components. Similar structures will be designated with similar reference numerals in a 310 series of reference numerals. The above description of similar structures also applies to this embodiment. It is further understood that the various embodiments disclosed herein have various structural and functional features that may be combined with one another according to the present invention.

The dispensing faucet shown in FIGS. 45-55 is generally designated with the reference numeral 310. The dispensing faucet 310 generally includes a housing 312 and a spout 314. As described in greater detail below, the spout 314 is removably attached to the housing 312. The spout 314 could be integral with the housing 312 if desired. It is understood, as with previous embodiments, that the dispensing faucet 310 could also be considered as not utilizing the spout 314. As also described in greater detail below, it is understood that a cleaning nozzle, similar to the cleaning nozzle 16 of FIGS. 22-24, can also be used with the dispensing faucet 310 of FIGS. 45-57. As can be appreciated from the previous figures, the nozzle is configured to be removably attached to the housing 312. The nozzle can then be removably attached to the housing 312 for easy cleaning of the housing 312 and other portions of the system 1.

FIGS. 45-51 further show the housing 312 of the dispensing faucet 310. The housing 312 generally includes a main body structure 318 and having a protrusion 320, extension member 320 or nipple 320 extending from the body 318. The protrusion 320 can be integral with the body structure 318 or can be a separate component that is mounted or otherwise secured to the main body structure 318.

The main body structure 318 defines a peripheral structure. The main body structure also has a connection structure 334. The connection structure 334 can take various forms and in on exemplary embodiment, the connection structure 334 includes screw threads dimensioned to cooperate with the connecting member 11 or threaded member or screw threads 11 on the shank connector 5. In a further exemplary embodiment, the body structure 318 has a series of teeth dimensioned to mesh with corresponding teeth on the shank connector 5. In further exemplary embodiments, the peripheral structure is bounded by the connection structure 311.

In an exemplary embodiment, the protrusion 20 has a length that extends beyond the peripheral structure defined by the body 18. The protrusion 320 further has the length that extends beyond the connection structure 334 of the body 318 and, in particular, the protrusion 320 extends beyond the screw threads of the connection structure 334. The protrusion 320 further has a contoured outer surface 321 that is convex in shape. In one exemplary embodiment, the contoured outer surface 321 has a generally dome shape. The dome shape of the protrusion 320 will cooperate with the generally domed volume portion of the shank connector 5 as shown in FIG. 4*b*, which will be further described below. A male/female configuration is thus provided. It is understood that various dome-shapes can be utilized including a hemispherical shape or a more pronounced cone-shape. Other shapes are also possible such as a catenoid shape, other segments of spheres, ellipsoids, or other shapes. The distal end of the protrusion 20 defines a seat to cooperate with the shank connector 5 to be described. As discussed, the body 318 further has the connection structure 334 that connects the housing 312 to the shank connector 5. The protrusion 320 uniquely cooperates with the shank connector 5 to provide an enhanced connection as described in greater detail below.

The extension member 320 or protrusion 320 cooperates with the body 318 to define a central conduit 322 through the housing 312. The central conduit 322 has an inlet opening 324 defined by a distal end of the protrusion 320, and the central conduit 322 further has an outlet opening 326 defined by the body 318. As further shown in FIG. 50, the central conduit 322 has a generally angled configuration through the housing 312, or through at least a portion of the housing 312. As the housing 312 is typically mounted in a generally horizontal configuration, the central conduit 322 has a portion that is angled downardly from the inlet opening 324 towards the outlet opening 326. Thus, the housing 312 has a lowermost floor 319 across the body 318 of the housing 312 and having an outer surface wherein the inlet opening 324 is positioned at a greater distance from the floor 319 than the distance of the portion of the central conduit 322 towards the outlet opening 326 from the floor 319. The lowermost floor 319 coincides with an outer surface of the body structure 318 that runs and extends generally parallel to a longitudinal extension of the body structure 318. With the housing 312 positioned in a generally horizontal configuration, the central conduit 322 generally slopes downwards from the inlet opening 324 and towards the outlet opening 326. In such configuration and as discussed further below, liquid in the central conduit 322 naturally drains from the inlet opening 324 towards the outlet opening 326. In an exemplary embodiment, the central conduit 322 is configured to slope downwardly from the inlet opening 324 through the housing 312 and to the outlet opening 326 wherein liquid will drain naturally via gravity and flow out of the spout 314 and out of the system 1. It is further understood that the central conduit 322 defined in the protrusion 320 slopes downwardly. It is understood that the downward slope of the central conduit 322 can vary as desired wherein certain embodiments may have a greater slope than other designs where the slope is more gradual.

Figure 50:
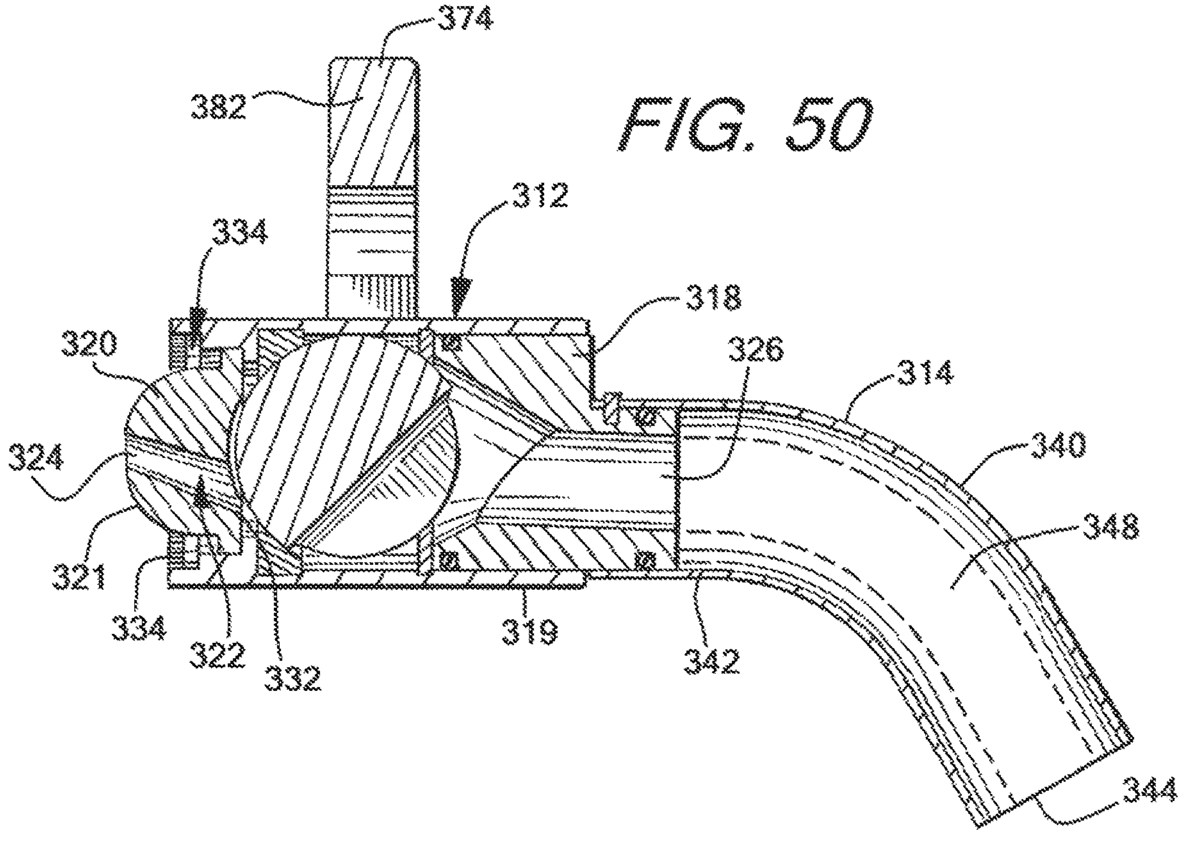
FIG. 50 is a cross-sectional view of the dispensing faucet of FIG. 45 taken along line 50-50 of FIG. 48, the dispensing faucet being in a closed faucet position.
Figure 51:
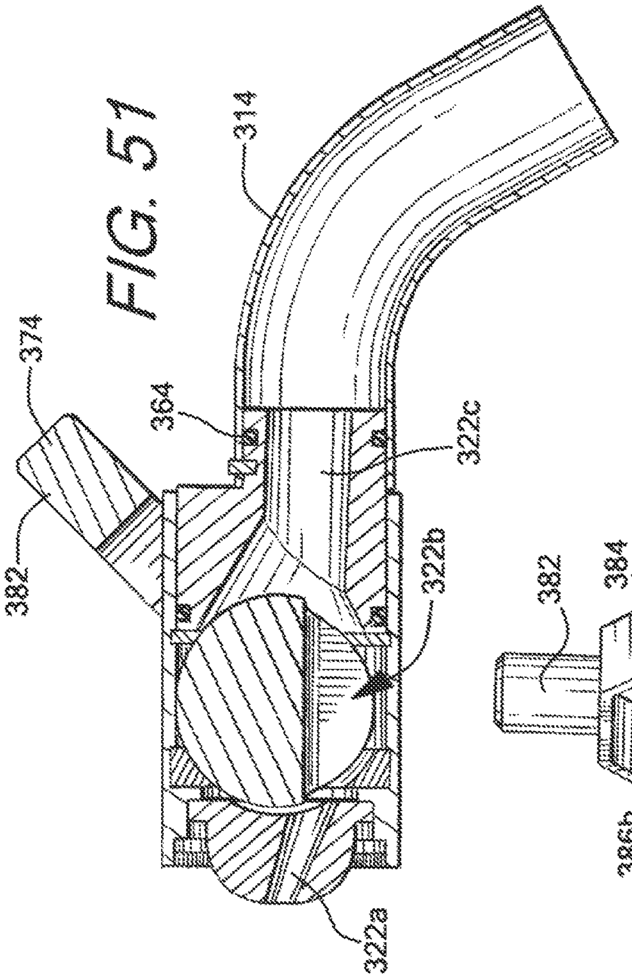
FIG. 51 is a cross-sectional view of the dispensing faucet of FIG. 45 taken along line 51-51 of FIG. 49, the dispensing faucet being in an open faucet position.
Figure 52:
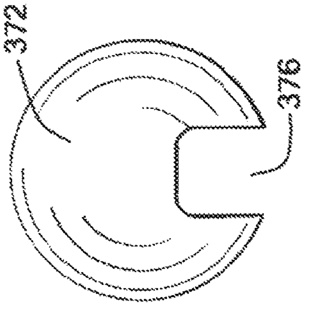
FIG. 52 is a schematic end view of a valve member of the dispensing faucet of FIG. 45.

As further can be appreciated from FIGS. 50-52, the central conduit 322 may have a plurality of sections that cooperate to form the central conduit 322 through the housing 312. In an exemplary embodiment, the central conduit 322 may have a first section **322*a*, or entry section 322*a*, an intermediate section 322*b*, and an second section 322*c*, or exit section 322*c*. The first section 322*a* is generally positioned in the protrusion 320 and has the inlet opening 324 at a first end and a second end generally opposite the inlet opening 324. As will be described in greater detail below, the second end defines a valve seat 332. As further shown in FIGS. 50-51, the first section 332*a* is sloped downwardly from the inlet opening 324 and towards the outer surface of the floor 319 of the body 318. The inlet opening 324 is positioned a distance from the outer surface that is greater than a distance between the second end of the first section 332*a* and the outer surface of the floor 319. The intermediate section 322*b* of the central conduit is positioned generally between the entry section 322*a* and the exit section 322*c*. The intermediate section 322*b* is generally at a central portion of the housing 312. As will be described in greater detail below, the intermediate section 322*b* is also defined cooperatively with the valve member and a bottom portion of the body structure 318 and inner surface which is opposite the outer surface defined by the floor 319. The second section 322*c* or exit section 322*c* is positioned generally adjacent the intermediate section 322*b* and downstream thereof. The exit section 322*c* has a first end that cooperates with an outlet associated with the valve member and a second end that corresponds to the outlet opening 326 in the body structure 318 of the housing 312. It is further understood that the first end of the exit section 322*c* is positioned a distance from the outer surface that is greater than a distance between the outlet opening 326 and the outer surface. Thus, as can be appreciated from FIGS. 50-51, the entry section 322*c*, the intermediate section 322*b* and the exit section 322*c* are in fluid communication with one another in sequential configuration to form the central conduit 322. As discussed, the central conduit 322 is sloped downwardly towards the outer surface of the floor 319. As further shown, the central conduit 322 defines a lowermost surface through the conduit 322 that is at a greater distance from the outer surface of the floor 319 proximate the inlet opening 324 and is then at a lesser distance from the outer surface of the floor 319 as the conduit 322 extends toward the outlet opening 326. In this configuration, fluid in the conduit 322, such as beer when in a beer dispensing system 1, will continue to flow out of the faucet 310 even when the faucet 310 is placed in a closed configuration, which helps in the overall cleanliness of the faucet 310 and system 1**.

In addition, in certain exemplary embodiments, the central conduit 322 may have an internal dimension in cross-section that varies along the length of conduit 322. For example, the inner dimension may gradually increase as the conduit 122 extends towards the outlet opening 126. The inner dimension, such as an inner diameter, may increase from the inlet opening 124 to the outlet opening 126. As can be further appreciated from FIGS. 50 and 51, the cross-sectional dimension of the entry section **322*a* generally increases from the inlet opening 324 towards the outlet opening 326 and including towards the valve seat 332. The intermediate section 322*b* can also have a gradually increasing cross-sectional dimension. The exit section 322*c* also has a generally increasing cross-sectional dimension from the first end proximate the valve member and towards the outlet opening 326. In such configuration, the expansion of the fluid through the faucet 310 is controlled, which enhances the dispensing of the fluid such as beer from the faucet 310**.

As further shown in FIGS. 50 and 51, the central conduit 322 further defines a valve seat 332 in the housing 312. The valve seat 332 is dimensioned to cooperate with the valve assembly to be described below. In this embodiment as shown in FIGS. 50 and 51, the valve seat 332 is defined at the second end of the entry section **332*a* of the central conduit 322. Thus, the valve seat 332 is defined internal to the body structure 318. It is understood that the valve seat 332 can have a resilient member 335 associated therewith to enhance a seal against the valve assembly 170 to be described. As discussed, the body structure 318 defines a longitudinal extension between the inlet opening 324 and the outlet opening 326. Further in this embodiment, the valve seat 332 is located along the central conduit 322 at a closer distance to the inlet opening 324 than a distance to the outlet opening 326. Thus, the distance along the central conduit 322 between the inlet opening 324 and the valve seat 332 is less than the distance along the central conduit 322 between the valve seat 332 and the outlet opening 326. This configuration, minimizes the amount of fluid maintained in the central conduit 322 when the faucet is in a closed position. It is understood that any fluid downstream of the valve seat 332 drains along the central conduit 322 and out of the faucet 310** when the faucet is in the closed position.

FIGS. 45-47 and 50-51 show the valve assembly used with the faucet 310. The body 318 further has a housing aperture 328 that is configured to cooperate with the valve assembly 370 of the faucet 310. It is understood that the valve assembly 370 cooperates with the housing 312 to open and close the dispensing faucet 310. Thus, it is understood that the valve assembly 370 has portions that pass through the housing aperture 328 to provide a mechanical linkage between the valve handle and valve member inside the housing 312 as can be appreciated from the figures. As previously disclosed, different valve structures could be used including butterfly or ball valve structures. In this exemplary embodiment and as shown in FIGS. 50-52, a ball valve type structure is utilized. The valve assembly generally includes a valve member 372 and a valve handle 374. The valve assembly 370 is located proximate a central location of the housing 112 as can be appreciated FIGS. 50-51. This location assists in providing a design that distributes forces associated with valve actuation throughout the housing 112 thus minimizing stress point locations that can lead to premature faucet failure.

As shown in FIGS. 50-52, the valve member 372 is in the form of a ball member. The valve member 372 thus has a generally spherical shape over a majority of its outer surface. The valve member 372 has a channel 376 or passageway 376, or tunnel 376 through the valve member 372. In one embodiment, the channel 376 is generally a U-shaped channel. The channel 376 has a first end and a second end. The first end of the channel 376 is dimensioned to mate with the valve seat 332 when the faucet 310 is in the open position. The second end of the channel 376 opens into the exit section 322*c* of the central conduit 322. It is understood that the channel 376 cooperates with a bottom surface of the housing 312 to help define the central conduit 322. It is further understood that the channel 376 can be dimensioned to have an increased volume from the first end to the second end. The valve member 372 cooperates with resilient sealing member 335 when the valve member 372 is rotated by the handle 374 to place the valve member 372 in a closed faucet position.

FIGS. 45-51 further show the valve handle 374. The valve handle has a stem 382 and U-shaped member 384 having a first leg 386*a* and a second leg 386*b*. The legs 386*a*,386*b* are spaced from one another and fit around the housing 312. As further shown in FIGS. 50 and 51, the valve member 372 is positioned in the central portion of the housing 312. One of the first leg 386*a* and the second leg 386*b* is connected to the valve member 372 through the aperture 328 in the body structure 318 of the housing 312 to provide a mechanical linkage as can be appreciated from the figures. The other leg is pivotally connected to the body structure 318 of the housing 312 to provide overall support for movement of the stem 382. As explained in greater detail below, the valve handle 374 is pivoted wherein the valve member 372 is also pivoted to place the faucet in open and closed positions. It is understood that in a closed faucet position, an outer surface of the valve member 372 mates against the valve seat 332 wherein the channel 376 is not aligned with the entry section 322*a* and the exit section 322*c* of the central conduit 322 (and further in cooperation with the resilient sealing member 335). It is further understood that in an open faucet position, the channel 376 is aligned with the entry section 322*a* and the exit section 322*c* in cooperation to define the central conduit 322.

Figure 47:
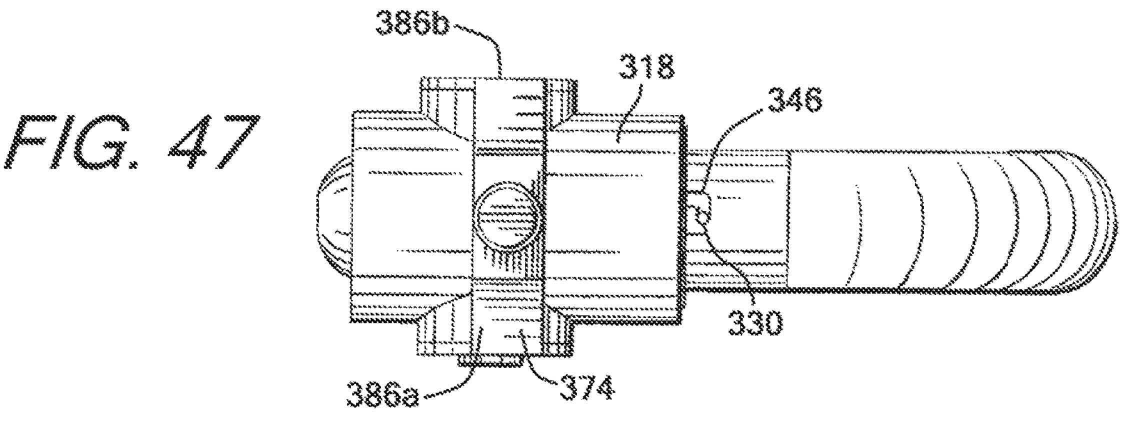
FIG. 47 is a top plan view of the dispensing faucet of FIG. 45.
Figure 48:
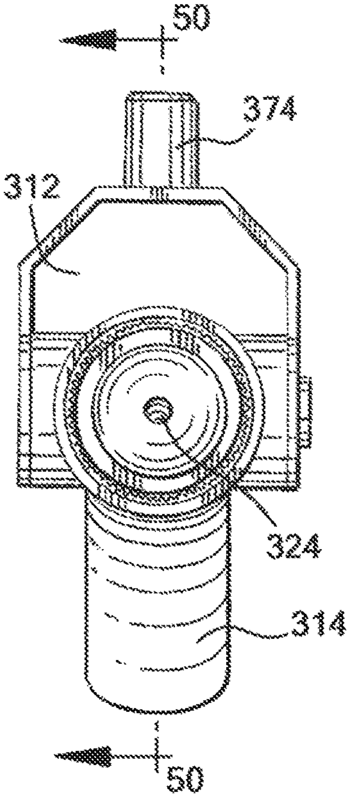
FIG. 48 is an end view of the dispensing faucet of FIG. 45 and in a closed faucet position.
Figure 49:
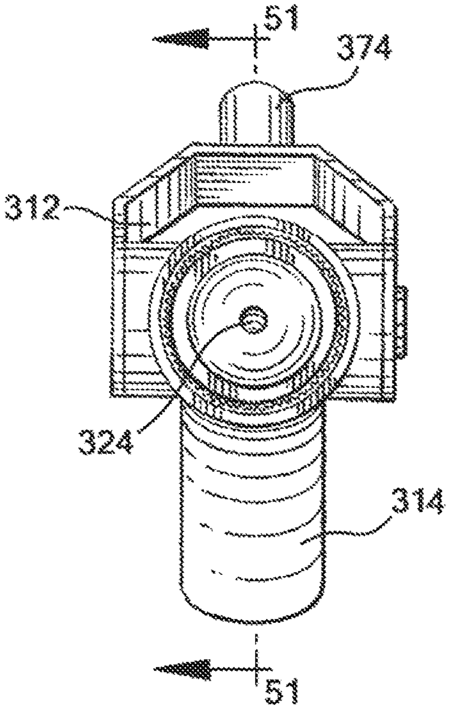
FIG. 49 is an end view of the dispensing faucet of FIG. 45 and in an open faucet position.

As shown in FIG. 47, the body 318 further has a post 330 for cooperation with structures on the spout 114 to be described. The post 330 is configured to cooperate with structures on the spout 314 to allow the spout 314 to be detachably connected to the housing 312. The body 318 further has a pair of spaced, circumferential ribs 362, generally adjacent to the post 330. A sealing member 364 (shown schematically in FIG. 45) in the form of an O-ring is positioned between the ribs 362. The sealing member 364 assists in providing a fluid-tight connection between the housing 312 and the spout 314.

As discussed, in an exemplary embodiment, the protrusion 320 has a length that extends beyond the peripheral structure defined by the body 318. The distal end of the protrusion 320 defines a seat to cooperate with the shank connector 5. The body 318 further has the connection structure 334 that connects the housing 312 to the threaded member 11 of the shank connector 5. The protrusion 320 uniquely cooperates with the shank connector 5 to provide an enhanced connection similar as described above. The distal end of the protrusion 320 defines the inlet opening 324 that is dimensioned to coincide or correspond to the internal passageway 8 of the shank connector 5. The inlet opening 324 is generally in confronting relation to the internal passageway 8. An O-ring may also be utilized as described above. With the inlet opening 324 generally the same or similar in dimension with the outlet opening of the internal passageway 8, any volume expansion is minimized or eliminated, which promotes laminar flow as discussed herein. The cooperating male/female configuration between the shank connector 5 and the dome-shaped protrusion 320 enhances this connection.

FIGS. 45-51 further show the spout 314 of the dispensing faucet 100. The spout 314 is generally similar to the spout 14 shown in FIGS. 18-21. The spout 314 has a generally curved body structure 340. The body 340 defines a spout inlet 342 and a spout outlet 344 and has a fluid conduit 348 therebetween. The body 140 has a slot 346 proximate the inlet 342. The slot 346 has two section that are generally transverse to one another to secure the spout 314 to the housing 312. The spout slot 146 is designed to cooperate with the post 130 of the housing 312. Once attached, the spout inlet 342 is aligned with and in fluid communication with the exit section 322*c* of the central conduit 322 of the housing 312. It is understood that the spout 314 can take on various different contours and vary in length as desired. A length and curved configuration of the spout 314 may be set based on the type of liquid beverage to be dispensed from the dispensing faucet 310. The size of the fluid conduit 348 of the spout 314 could also be varied as desired such as shown schematically by the broken lines in FIG. 50. The fluid conduit 348 is further configured to allow further drainage of liquid from the sloped central conduit 322 of the housing 112.

It is understood that a kit could be provided with the faucets herein. The spout 314 could be comprised of a plurality of spouts 314 that are sized differently to accommodate different beverages being dispensed. The spouts 314 may have different lengths and/or differently-sized internal passageways. The spouts 314 may also be different to be used with different vessels such various types of glasses or growler type containers. Kits could also contain other components such as the cleaning nozzle and cleaning brushes described herein.

Figure 53:
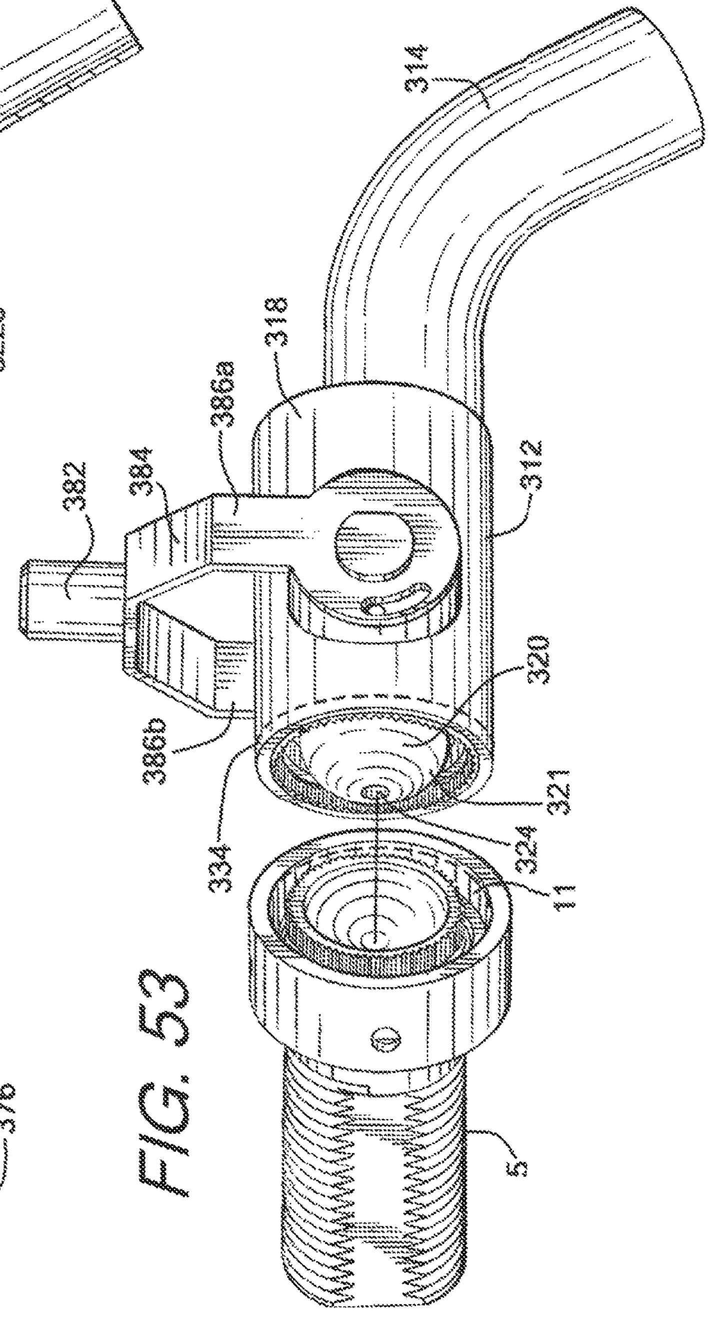
FIG. 53 is an exploded perspective view of the dispensing faucet of FIG. 45 and a shank connector.

In preparation for operation of the beverage dispensing system 1, it is understood that the beverage source such as in the form of beer kegs are tapped with the supply line and pressurized gas source as is customary and shown in FIG. 1. The supply line 4 has a respective shank connector 5 that is mounted at a bar location. As can be appreciated from FIGS. 53-55, the housing 312 of the dispensing faucet 310 is connected to the shank connector 5 via the connection structure 334 on the housing 312 cooperating with the connecting member 11 of the shank connector 5 in the form of threaded members (FIG. 53). In the exemplary embodiment, the screw threads on the housing 312 mate the with screw threads on the shank connector 5. The respective teeth on the housing 312 and the shank connector 5 also mate with each other. In this connection, contoured or dome-shaped end of the protrusion 320 is received by the dome-shaped volume portion of the shank connector 5 as can be appreciated from FIGS. 4*b* and 53). Accordingly, the protrusion 320 is positioned in confronting relation and engaged with an outlet of the passageway 8 of the shank connector 5. As discussed, the inlet of the protrusion 320 may also have a sealing member such as in the form of a resilient O-ring 333 (e.g., FIGS. 33, 55) that engages against the passageway 8. Accordingly, the outlet of the passageway 8 of the shank connector 5 is in fluid communication with the inlet opening 324 of the housing 312. The O-ring 333, if employed, assists in providing a fluid tight seal between the passageway 8 of the shank connector 5 and the inlet opening 324 defined by the protrusion 320. The cross-sectional size of the passageway 8 of the shank connector 5 is generally the same or similar to the cross-sectional size of the inlet opening 324 of the protrusion 320, and therefore, the sizes correspond to one another. The volume is generally maintained across this connection between the shank connector 5 and the protrusion 320. Thus, beer flowing across this connection does not experience a rapid volume increase as in prior art designs. The spout 314 is also connected to the housing 112. The spout slot 346 receives the post 330 on the housing 312 and rotated slightly wherein the spout 314 is connected to the housing 312. The sealing member 364 assists in providing a fluid tight seal between the housing 312 and the spout 314.

Figure 54:
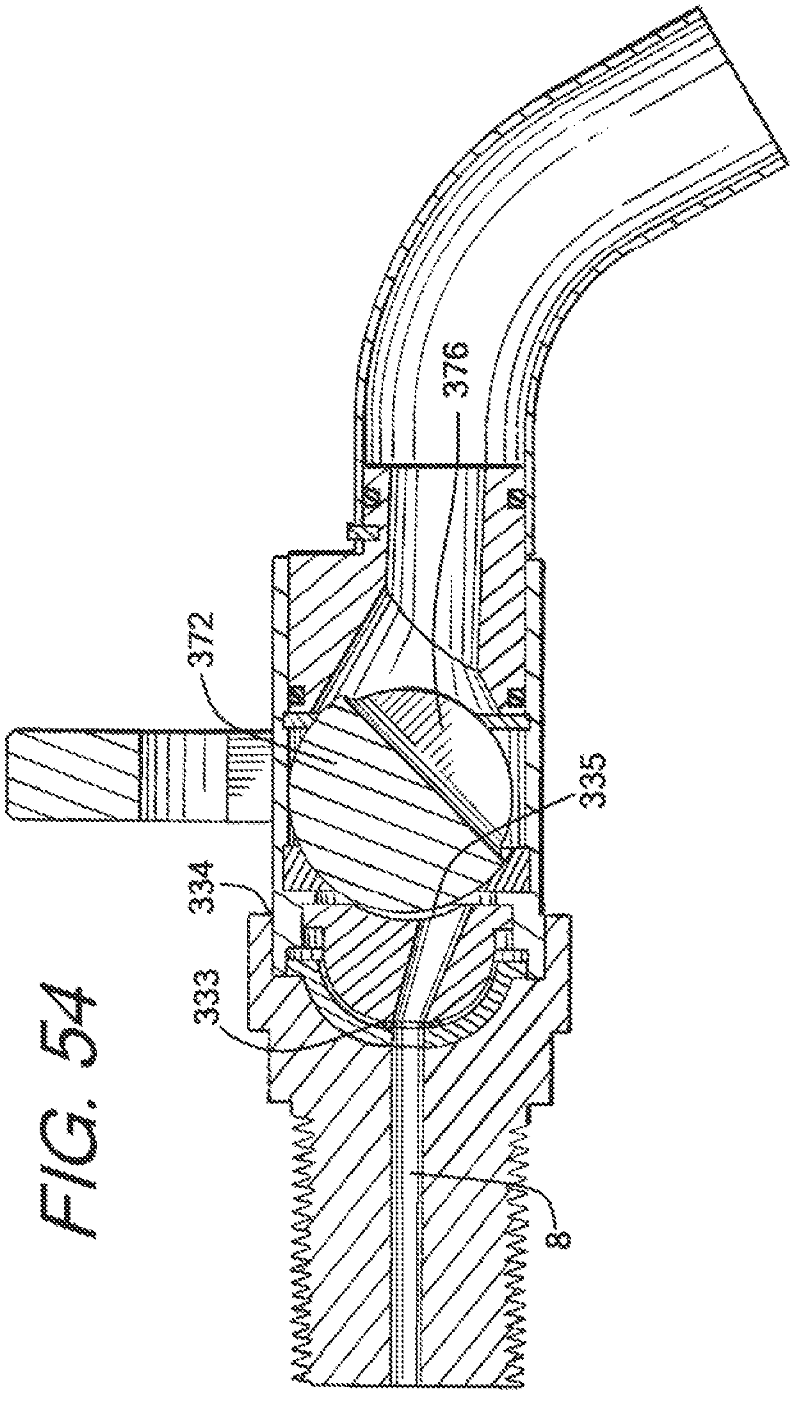
FIG. 54 is a schematic cross-sectional view of the dispensing faucet of FIG. 45 connected to the shank connector wherein the dispensing faucet is in a closed faucet position.
Figure 55:
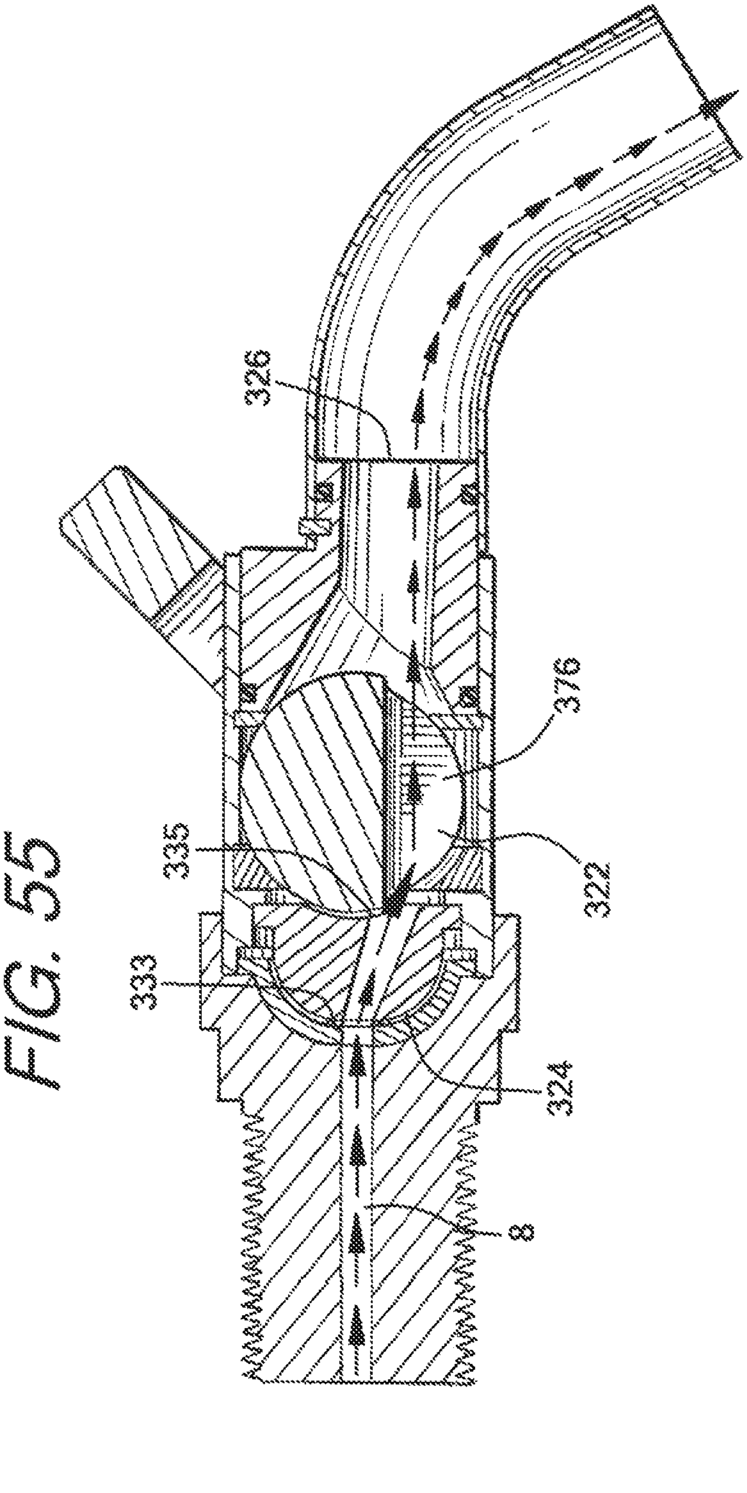
FIG. 55 is a schematic cross-sectional view of the dispensing faucet of FIG. 45 connected to the shank connector wherein the dispensing faucet is in an open faucet position.

FIGS. 50 and 54 show the dispensing faucet 310 in a closed position. The valve handle 374 is in a vertical position, which places the valve member 372 in a position wherein an outer surface of the valve member 372 is engaged against the valve seat 332 and in cooperation with the sealing member 335. Thus, the channel 376 is not aligned with the entry section 332*a* wherein the central conduit 322 is closed off. As shown in FIGS. 51 and 55, when a user engages the valve handle 374 to pivot and displace the valve handle 374, rotation of the valve member 372 is affected wherein the channel 376 is aligned with the valve seat 332 wherein the central conduit 322 is fully defined placing the faucet 310 in an open position. Described somewhat differently, the valve member 372 is displaced from the valve seat as the valve seat is moved wherein the channel 376 is aligned to provide an opening for the central conduit 322. This allows the liquid beverage to flow through the dispensing faucet 310 as shown by the arrows in FIG. 55. This defines an open faucet position. The user can further engage the valve handle 374 to return the valve member 372 to a closed position wherein the outer surface of the valve member 372 engages the valve seat 322 and the sealing member 335 to define the closed faucet position.

The dispensing faucet 310 provides significant enhancements in the operation of the beverage dispensing system 1. Similar as shown in the previous figures, the protrusion 320 is aligned with, in confronting relation and engaged with the passageway 8 of the shank connector 5. The protrusion 320 is structured and dimensioned such that there is a fluid tight fit between the end of the passageway 8 defined by the shank connector 5 and the inlet opening 324 defined by the protrusion 320. The O-ring 333 may assist in this connection. As further can be appreciated from the figures, the passageway 8 and the central conduit 322 defined by the protrusion 320 are dimensioned such that the respective volumes are similar. With generally similar volumes, when the valve assembly 370 of the dispensing faucet 310 is opened and the liquid beverage flows through the faucet 310, a more laminar flow of the liquid beverage is achieved through the faucet 310. Accordingly, a smoother pour from the spout 314 is achieved and having less foam. FIG. 26 schematically shows a more laminar flow achieved with the dispensing faucet 10 of the present invention and the dispensing faucet 310 would achieve the same laminar flow. Thus, the cooperation between the protrusion 320 and shank connector 5 provides an enhanced flow control connection for the stream of liquid beverage that passes through the dispensing faucet 310 when the valve assembly 370 is opened. Pressurized fluid expansion is minimized at the dispensing faucet 310. Because of the downwardly sloped configuration of the central conduit 322, once the valve assembly 370 is closed to stop liquid flow through the faucet 310, most of the liquid remaining in the conduit 322 will drain from the housing 312 and spout 314. Even to the extent any liquid accumulates at a central portion of the housing 312, a significant portion of the liquid will drain naturally towards the outlet opening 326. This helps to minimize stagnant liquid in the housing 312 which leads to a less clean dispensing system 1.

FIGS. 56-57 show an alternative embodiment of the dispensing faucet 310 shown in FIGS. 45-52. In this embodiment, the valve member 372 is generally a full spherical ball valve member. The channel 376 passes completely through an internal portion of the ball member 372 and does not have an open portion as in the channel 376 of FIGS. 50-52.

Figure 58:
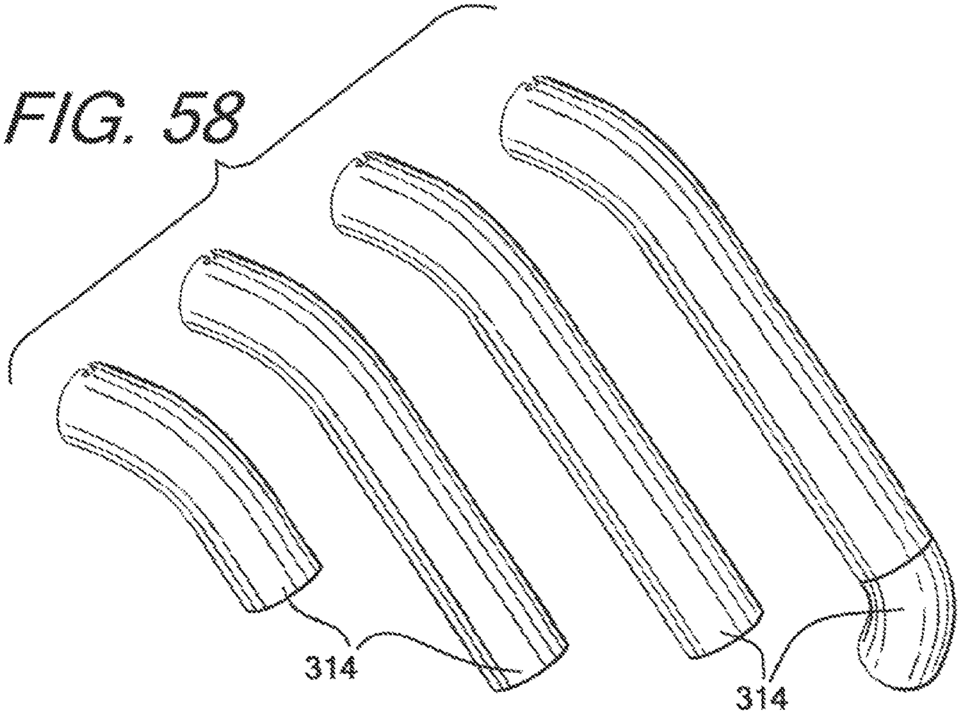
FIGS. 58-59 show a plurality of spouts.
Figure 59:
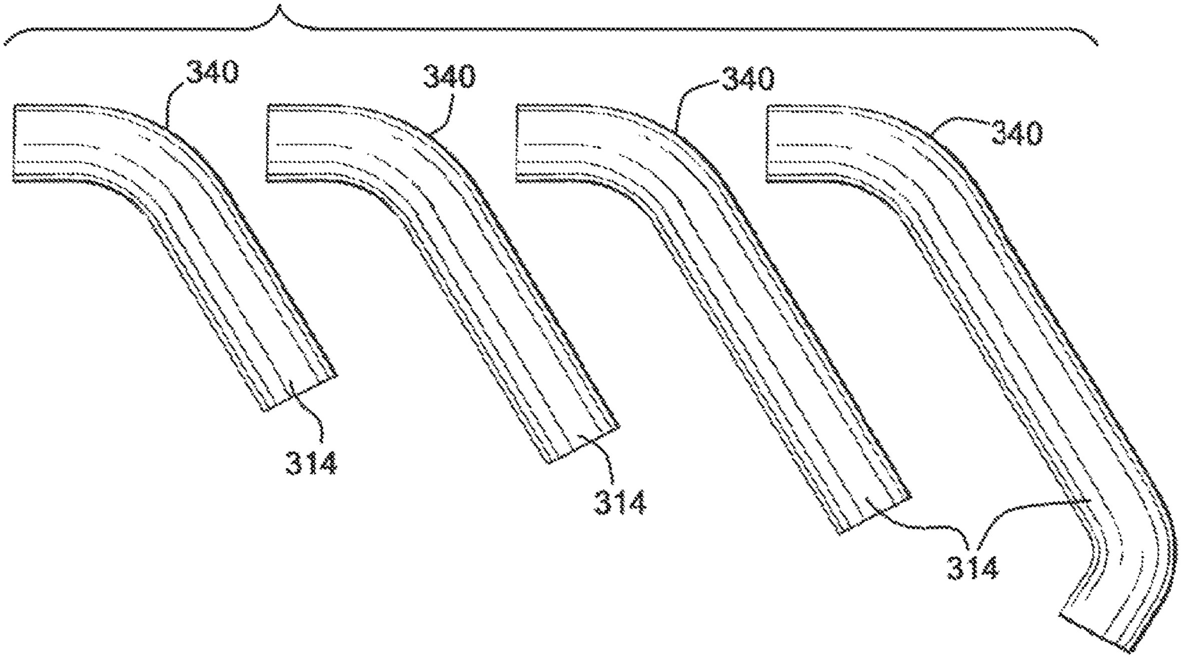
Figure 60:
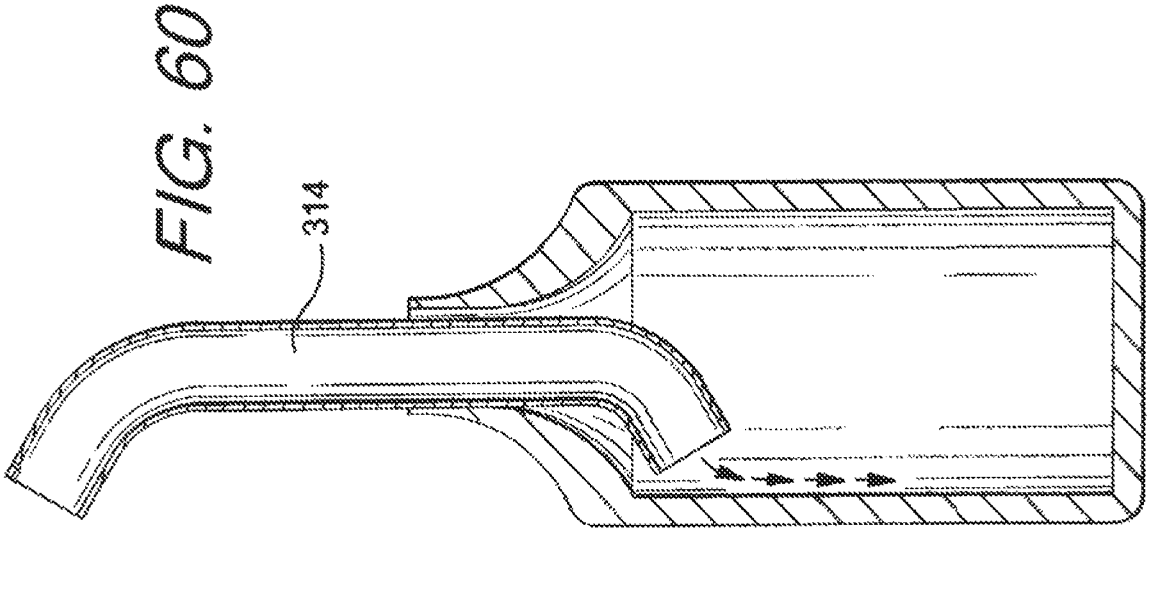
FIG. 60 shows a specialty spout used to pour a beverage into a specialty vessel in the form of a growler-type vessel.

As discussed, the spout 314 could have a variety of configurations. FIGS. 58-60 show a plurality of spouts 314. The spouts 314 may include a small-sized spout, a medium-sized spout and a large-sized spout. A user of the beer dispensing system 1 may utilized one or more of the spouts 314 based on the type of liquid beverage, or particular type of beer, that is being dispensed through the faucet 310. For example, a particular type of beer may be dispensed best through a spout 314 having a particular length. It is understood that the spout 314 could also have a particular internal diameter based on the type of beverage being dispensed, or also have a combination of length and internal diameter. A specialty-type spout 314 could also be used such as shown in FIG. 60. This spout 314 may be used in dispensing beer into a growler type vessel or container such as shown in FIG. 60. This specialty spout 314 has an initial entry section positioned in a first direction, an intermediate section being angled with respect to the first direction, with an exit section positioned in a direction generally opposite to the first direction. This allows the specialty spout 314 to be inserted into a growler vessel having a narrow entry opening wherein the vessel has an increased body dimension with respect to the entry opening. The exit section is then directed at the sidewall of the increased body dimension wherein beer is directed to the sidewall of the body of the growler vessel and wherein foaming is minimized.

Figure 61:
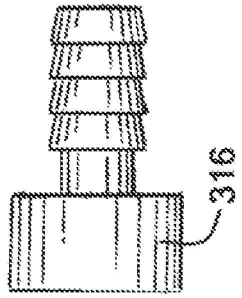
FIG. 61 is a side elevation view of a cleaning nozzle.

FIG. 61 shows a cleaning nozzle similar to the cleaning nozzle 16 shown in FIGS. 22-23 and that can be used with the dispensing faucet 310. As discussed, the cleaning nozzle 316 is used to clean the housing 312 of the faucet 310 and other portions of the system 1. The spout 314 is removed from the housing 312 and the cleaning nozzle 36 attached to the housing 312 (similar to the configuration as shown in FIG. 8).

Figure 62:
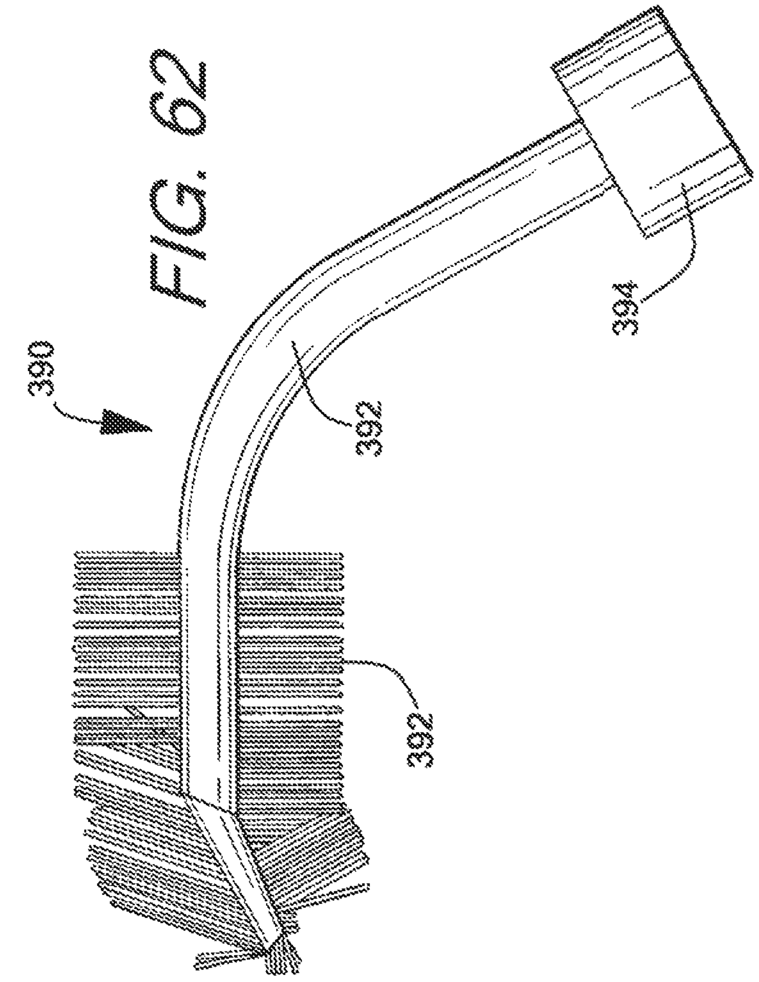

FIGS. 62-65 disclose additional features of the invention in the form of cleaning brush assemblies 390 that can be used in conjunction with the cleaning nozzle. The cleaning brush has an elongated brush member 392 and a base cap 394. The brush member 392 may have some flexibility. As shown in FIG. 62-63, the distal end of the elongated brush member 392 is inserted into the distal end of the spout 314 wherein the brush member 392 engages inner surfaces of the spout 314 and housing 312 defining the central conduit 322. With the dispensing faucet positioned in the closed faucet position, the brush member 392 extends to the valve member 372. The base cap 394 may be spaced from the distal end of the spout 314. Alternatively, and as shown via the broken lines, the base cap 394 may be removably secured to the distal end of the spout 314. In such configuration, the dispensing faucet is closed off from an outside environment such as in a stored position when an establishment is closed. This assists in maintaining cleanliness of the system 1. As shown in FIGS. 64-65, the brush member 392 can have a shorter configuration. In this configuration, the spout 314 is removed from the housing 312 and the brush member 392 is inserted into the outlet opening 326 of the housing 312. The base cap 394 is removably secured to the housing 312 to close off the outlet opening 326 from an outside environment.

Figure 3A:
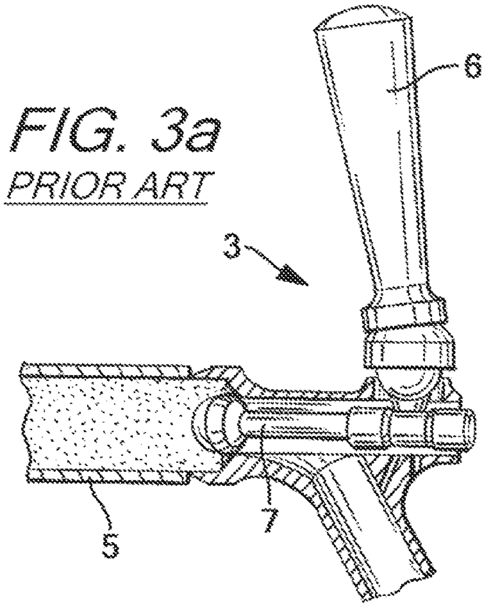
FIG. 3a PRIOR ART
FIG. 3*a* is a side elevation view of the prior art dispensing faucet of FIG. 2 connected to the shank connector and in a closed position.
Figure 3B:
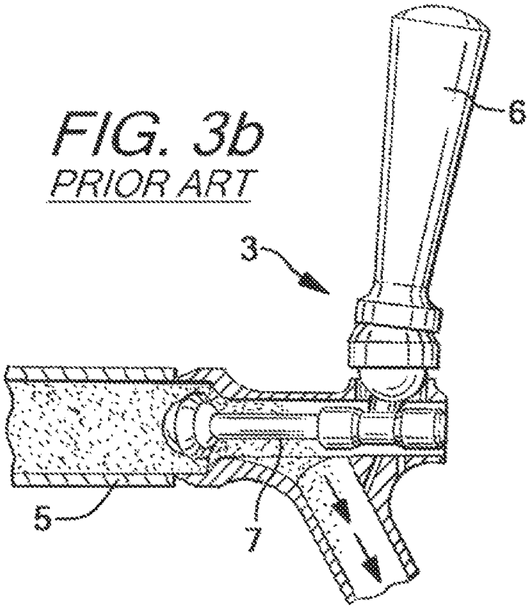
FIG. 3b PRIOR ART
FIG. 3*b* is a side elevation view of the prior art dispensing faucet of FIG. 2 connected to the shank connector and in an open position.
Figure 9:
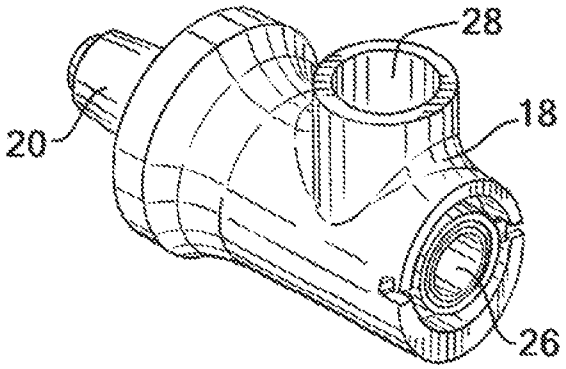
FIG. 9 is a perspective view of a housing of the dispensing faucet.
Figure 10:
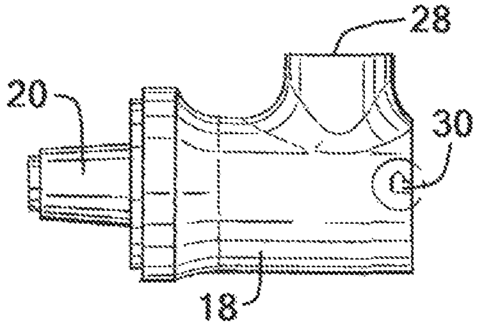
FIG. 10 is a side elevation view of the housing of the dispensing faucet.
Figure 11:
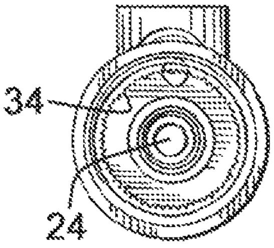
FIG. 11 is a rear view of the housing of the dispensing faucet.
Figure 12:
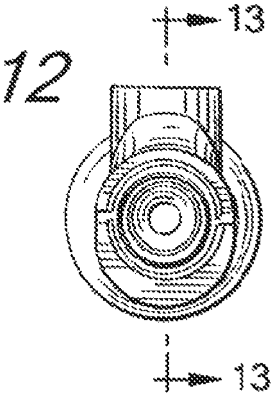
FIG. 12 is a front view of the housing of the dispensing faucet.
Figure 13:
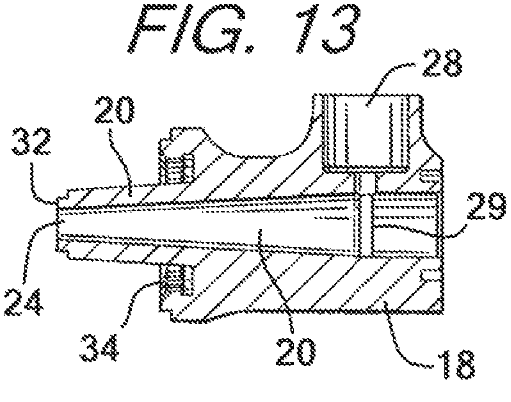
FIG. 13 is a cross-sectional view of the housing of the dispensing faucet taken along line 13-13 in FIG. 12.

The dispensing faucet of the present invention provides several benefits. As discussed, a smoother pour of the liquid beverage is achieved having no undue foaming. In prior art dispending faucets such as shown in FIG. 4*a-c*, there is a significant increase in volume as the liquid beverage flows from the passageway of the shank connector to the inlet of the dispensing faucet. With the liquid beverage, such as beer, being pressurized, the increase in volume results in a more turbulent flow producing an undesirable level of foaming of the beer. This results in undue waste of product. The structure of the dispensing faucet of the present invention provides a similar volume area from the passageway of the shank connector to the inlet of the dispensing faucet and providing a more laminar flow through the dispensing faucet. Only the desired amount of foam is provided with the liquid beverage. This minimizes wasted product in the form of excess foam which is typically discarded. With the structure of the dispensing faucet of the present invention, flow control through the faucet is enhanced. Because foaming of the liquid beverage is minimized as desired, additional processes, controls or other connections are minimized or unnecessary. Additional connections could be used with the dispensing faucet to further enhance the system if desired. In addition, the beverage dispensing system of the present invention can be better cleaned and more easily cleaned than prior art designs. In prior art dispensing faucets, more internal components were subjected to the liquid beverage promoting bacteria buildup and leading to hygiene concerns. Because the spout is easily removed, more internal areas of the housing can be readily exposed for cleaning of bacteria. Thus, unobstructed access to more internal areas of the dispensing faucet is increased for enhanced cleaning and disinfecting. Attachment of the cleaning nozzle further allows better cleaning of the dispensing faucet as well. In addition, the downwardly sloped central conduit allows for natural drainage of liquid from the housing when the faucet is placed in a closed position. This minimizes stagnant fluid in the system that can contribute to uncleanliness of the system. Finally, the structure of the dispensing faucet including the protrusion structure, and valve structure placement provides for better force distribution along the faucet and minimizes stress concentration points that often lead to structural failures of prior art dispensing faucets after certain cycles of use. For example, in prior art dispensing faucets, the valve structure is located more towards an inlet where a connection is made to the shank connector (FIGS. 3*a* and 3*b*). This provides more stress concentration points in the faucet. With the valve structure located at a more central location of the housing as in the present invention, stress concentration points are minimized and forces distributed more optimally throughout the housing and leading to a greater useful life of the dispensing faucet. Furthermore, with the configuration of the valve member, in the open faucet position, the central conduit is completely unobstructed. Fluid flow does not have to pass around valve structures in the open position such as shown in the prior art of FIG. 3. An unobstructed path provides for more laminar flow and less turbulence to further minimize foaming of the beverage such as beer. The beer passes freely through the channel in the open faucet position. In addition, the valve seat is positioned closer to the inlet opening than to the outlet opening. This configuration minimizes the volume of beer upstream of the valve seat that may sit in the conduit when the faucet is in the closed position. The various spouts also provide for enhanced pouring of particular beverages through the faucet. The cleaning brush assembly further provided enhanced cleaning and storing configurations. For example, the base cap closes off the spout from an outside environment such as when storing the faucet in a closed position until an establishment is opened a next day or shift. Furthermore, the spout can be removed after each day and a shorter cleaning brush assembly inserted into the faucet to close off the faucet from an outside environment. The spouts from the faucets can then be stored in a cleaning solution until the next time for use. This enhances the cleanliness of the faucet, spout and overall system.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A beer dispensing faucet configured to be connected to a shank connector, the shank connector defining a passageway having an outlet opening, the shank connector further defining a distal end, wherein the outlet opening of the passageway opens into a dome-shaped volume portion proximate the distal end, the shank connector further having a connecting member, an inlet of the passageway configured to be connected to a pressurized beer source, the beer dispensing faucet comprising:

a housing having a body and a connection structure configured to be connected to the shank connector, the housing defining a central conduit, therethrough, the central conduit having an inlet opening and an outlet opening, the central conduit further defining a valve seat in the housing, the body defining a protrusion defining the inlet opening of the central conduit, wherein the protrusion has a contoured outer surface, wherein when the dispensing faucet is connected to the shank connector, the protrusion is received in the dome-shaped volume portion;

a valve assembly having a valve member, the valve member operably associated with the valve seat of the central conduit, wherein when the dispensing faucet is configured to be connected to the shank connector, the inlet opening is configured to be positioned in confronting relation to and engaged with the outlet opening of the passageway of the shank connector, wherein the inlet opening of the central conduit is configured to be in fluid communication with the outlet opening of the passageway, a spout having a fluid conduit therethrough defining an inlet and an outlet, the spout being detachably connected to the housing, wherein the housing has a slot and the spout has a post, wherein the post is received in the slot when the spout is attached to the housing, wherein the inlet of the spout is in fluid communication with the outlet opening of the central conduit, and wherein the valve member has a first position wherein the valve member is engaged with the valve seat to define a closed faucet position, the valve member having a second position displaced from the valve seat to define an open faucet position.

2. The beer dispensing faucet of claim 1, wherein the housing has a first circumferential rib spaced from a second circumferential rib and a sealing member positioned between the ribs, wherein when the spout is attached to the housing, the sealing member engages an inner surface of the spout to provide a substantial fluid tight seal between the housing and the spout.

3. The beer dispensing faucet of claim 1 further comprising a plurality of spouts, each spout of the plurality of spouts having a different length, wherein each spout of the plurality of spouts is detachably connectable to the housing.

4. The beer dispensing faucet of claim 1 further comprising a cleaning brush assembly having a brush member extending from a base cap, wherein the brush member is inserted through the spout and past the outlet opening and into the central conduit, wherein the base cap is positioned proximate an outlet of the spout.

5. The beer dispensing faucet of claim 1 wherein the central conduit is angled downwardly from the inlet opening towards the outlet opening, wherein the housing defines a lowermost floor having an outer surface running parallel to a longitudinal extension of the body, wherein the inlet opening is positioned a distance from the outer surface that is greater than a distance between the outlet opening of the central conduit and the outer surface.

6. The beer dispensing faucet of claim 1 wherein the central conduit has an internal diameter, wherein the internal diameter increases along the central conduit from the inlet opening to the outlet opening.

7. The beer dispensing faucet of claim 1 wherein the central conduit has a length defined between the inlet opening and the outlet opening, wherein a distance from the inlet opening to the valve seat is less than a distance from the valve seat to the outlet opening.

8. The beer dispensing faucet of claim 1 wherein the valve member is a spherical shaped member having a channel therethrough, wherein in the closed faucet position the channel is misaligned with the inlet opening and the outlet opening, wherein in the open faucet position, the channel is aligned with the inlet opening and the outlet opening.

9. The beer dispensing faucet of claim 1 wherein when the valve member is in the open faucet position, the central conduit is unobstructed.

10. The bear dispensing faucet of claim 1 wherein proximate the inlet of the spout, the spout has an initial entry section positioned to convey beer in a first direction, the spout further has an intermediate section being angled with respect to the first initial entry section, the spout further having an exit section proximate the outlet of the spout positioned to convey beer in a second direction wherein the second direction is different than the first direction.

11. A beer dispensing faucet configured to be connected to a shank connector, the shank connector defining a passageway having an outlet opening, the shank connector further defining a distal end, wherein the outlet opening of the passageway opens into a dome-shaped volume portion proximate the distal end, the shank connector further having a connecting member, an inlet of the passageway configured to be connected to a pressurized beer source, the beer dispensing faucet comprising:

a housing having a body and a connection structure configured to be connected to the shank connector, the housing defining a central conduit therethrough, the central conduit having an inlet opening and an outlet opening, the central conduit further defining a valve seat in the housing, the both, defining a protrusion defining the inlet opening of the central conduit, wherein the protrusion has a contoured outer surface, wherein when the dispensing faucet is connected to the shank connector, the protrusion is received in the dome-shaped volume portion, the housing having a first slot and a second slot therein;

a valve assembly having a valve member, the valve member operably associated with the valve seat of the central conduit, wherein when the dispensing faucet is configured to be connected to the shank connector, the inlet opening is configured to be positioned in confronting relation to and engaged with the outlet opening of the passageway of the shank connector, wherein the inlet opening of the central conduit is configured to be in fluid communication with the outlet opening of the passageway, a spout having a fluid conduit therethrough defining an inlet and an outlet wherein the inlet of the spout is in fluid communication with the outlet opening of the central conduit, wherein the post has a first post and a second post thereon on generally opposite sides of the spout, wherein the first post is removably received in the first slot and the second post is removably received in the second slot to detachably connect the spout to the housing, wherein the housing has a first circumferential rib spaced from a second circumferential rib and a sealing member positioned between the ribs wherein when the spout is attached to the housing, the sealing member engages an inner surface of the spout to provide a substantial fluid tight seal between the housing and the spout, and wherein the valve member has a first position wherein the valve member is engaged with the valve seat to define a closed faucet position, the valve member having a second position displaced from the valve seat to define an open faucet position.

* * * * *